US012803818B2

(12) United States Patent
Kim et al.

(10) Patent No.: US 12,803,818 B2
(45) Date of Patent: Nov. 17, 2026

(54) STORAGE DEVICE, STORAGE SYSTEM HAVING THE SAME AND METHOD OF OPERATING THE SAME

(71) Applicant: SAMSUNG ELECTRONICS CO., LTD., Suwon-si (KR)

(72) Inventors: Minho Kim, Seongnam-si (KR); Younsung Chu, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 497 days.

(21) Appl. No.: 17/817,785

(22) Filed: Aug. 5, 2022

(65) Prior Publication Data

US 2023/0145936 A1 May 11, 2023

(30) Foreign Application Priority Data

Nov. 10, 2021 (KR) ........................ 10-2021-0153864
Mar. 28, 2022 (KR) ........................ 10-2022-0038079

(51) Int. Cl.
*H04L 9/32* (2006.01)
*G06F 16/27* (2019.01)
(Continued)

(52) U.S. Cl.
CPC .......... *H04L 9/3263* (2013.01); *H04L 9/0825* (2013.01); *H04L 9/3247* (2013.01)

(58) Field of Classification Search
CPC ... H04L 9/3263; H04L 9/0825; H04L 9/3247; H04L 9/3268; H04L 9/50; G06F 21/78;
(Continued)

(56) References Cited

U.S. PATENT DOCUMENTS 9,146,725 B2 * 9/2015 Nolterieke ................ G06F 8/65
10,880,071 B2 12/2020 Pandurangan et al.
(Continued)

FOREIGN PATENT DOCUMENTS

EP 3451257 3/2019
KR 10-1796690 11/2017

OTHER PUBLICATIONS

Lee, B., & Lee, J.-H. (2016). Blockchain-based secure firmware update for embedded devices in an Internet of Things environment. The Journal of Supercomputing, 73(3), 1152-1167. https://doi.org/10.1007/s11227-016-1870-0 (Year: 2016).*
(Continued)

*Primary Examiner* — John B King
*Assistant Examiner* — Nicholas Joseph Diluzio
(74) *Attorney, Agent, or Firm* — Morgan, Lewis & Bockius LLP

(57) ABSTRACT

Storage systems including a host device, a switch device, and storage devices connected to the host device through the switch device are described. Moreover, techniques for operating a host device, a switch device, and/or one or more storage devices are also described. One or more aspects of the present disclosure may provide for improved storage devices and systems via implementation of blockchain networks. In some cases, a storage device itself may be a node of a blockchain network, or a system including a storage device may be a node of a blockchain network. One or more aspects of the present disclosure provide for attestation of firmware (e.g., qualification verification to identify whether the firmware is operating normally) performed using the blockchain. Further, one or more aspects of the present disclosure describe techniques for performing device authentication between devices, for performing qualification
(Continued)

verification for firmware, for performing firmware updates, etc.

8 Claims, 21 Drawing Sheets

(51) Int. Cl.

| | |
|---|---|
| ***G06F 21/44*** | (2013.01) |
| ***G06F 21/62*** | (2013.01) |
| ***G06F 21/72*** | (2013.01) |
| ***G06F 21/78*** | (2013.01) |
| ***H04L 9/08*** | (2006.01) |

(58) Field of Classification Search

CPC ........ G06F 21/72; G06F 21/44; G06F 3/0614; G06F 3/0655; G06F 3/0679; G06F 16/27; G06F 21/572; G06F 21/62

See application file for complete search history.

(56) References Cited

U.S. PATENT DOCUMENTS

| | | | | |
|---|---|---|---|---|
| 10,896,266 | B1 | 1/2021 | Beserra et al. | |
| 10,936,302 | B2 * | 3/2021 | Eklund | H04L 9/0637 |
| 10,997,297 | B1 * | 5/2021 | Lin | H04L 9/30 |
| 11,223,606 | B2 | 1/2022 | Van De Groenendaal et al. | |
| 11,269,619 | B2 * | 3/2022 | Rouland | H04L 9/3236 |
| 11,507,359 | B2 * | 11/2022 | Chhuor | H04L 9/0643 |
| 2016/0306616 | A1 * | 10/2016 | Tomppo | G06F 13/4282 |
| 2018/0176229 | A1 * | 6/2018 | Bathen | H04L 9/3239 |
| 2018/0198616 | A1 * | 7/2018 | Feather | H04L 9/3273 |
| 2019/0065733 | A1 * | 2/2019 | Forehand | H04L 9/32 |
| 2019/0207748 | A1 | 7/2019 | Courtney | |
| 2019/0340379 | A1 * | 11/2019 | Beecham | H04L 9/3239 |
| 2020/0042217 | A1 * | 2/2020 | Roberts | G06F 3/0655 |
| 2020/0117690 | A1 * | 4/2020 | Tran | G10L 15/26 |
| 2020/0136837 | A1 | 4/2020 | Phatigaraphong et al. | |
| 2020/0213215 | A1 * | 7/2020 | Jayadevappa | H04L 63/08 |
| 2020/0313851 | A1 * | 10/2020 | Mondello | G06F 3/0655 |
| 2020/0344072 | A1 * | 10/2020 | Yan | H04L 9/3231 |
| 2021/0132826 | A1 * | 5/2021 | Kwok | G06F 3/0632 |
| 2021/0149663 | A1 * | 5/2021 | Zhang | H04L 9/0891 |
| 2021/0191883 | A1 * | 6/2021 | Shin | G06F 12/1466 |
| 2022/0094668 | A1 * | 3/2022 | Vedula | H04L 63/029 |
| 2022/0141036 | A1 * | 5/2022 | Jang | H04L 9/3247<br>713/176 |
| 2022/0329411 | A1 * | 10/2022 | Kodeswaran | H04L 9/50 |
| 2023/0239154 | A1 * | 7/2023 | Ali | H04L 63/0435<br>713/168 |
| 2023/0379699 | A1 * | 11/2023 | Oerton | H04W 12/37 |

OTHER PUBLICATIONS

Witanto, E. N., Oktian, Y. E., Kumi, S., & Lee, S.-G. (2019). Blockchain-based OCF firmware update. 2019 International Conference on Information and Communication Technology Convergence (ICTC), 1248-1253. https://doi.org/10.1109/ictc46691.2019.8939910 (Year: 2019).*

Dhakal, S., Jaafar, F., & Zavarsky, P. (2019). Private Blockchain Network for IOT device firmware integrity verification and update. 2019 IEEE 19th International Symposium on High Assurance Systems Engineering (HASE), 164-170. https://doi.org/10.1109/hase.2019.00033 (Year: 2019).*

Extended European Search Report dated Feb. 22, 2023 in corresponding European Patent Application No. 22202422.6 (6 pages).

* cited by examiner

STORAGE DEVICE, STORAGE SYSTEM HAVING THE SAME AND METHOD OF OPERATING THE SAME

CROSS-REFERENCE TO RELATED APPLICATION(S)

This application claims benefit of priority under 35 USC § 119 to Korean Patent Application No. 10-2021-0153864, filed on Nov. 10, 2021, and Korean Patent Application No. 10-2022-0038079, filed on Mar. 28, 2022, in the Korean Intellectual Property Office (KIPO), the disclosures of which are incorporated herein by reference in their entirety.

BACKGROUND

Example embodiments of the present disclosure relate generally to semiconductor integrated circuits, and more particularly to a storage device, a storage system having the same and a method of operating the same.

A processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor is configured to operate a memory array using a memory controller. In other cases, a memory controller is integrated into the processor. In some cases, the processor is configured to execute computer-readable instructions stored in a memory to perform various functions. In some embodiments, a processor includes special purpose components for modem processing, baseband processing, digital signal processing, or transmission processing.

Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

Flash memory is an electronic (solid-state) non-volatile computer storage medium that can be electrically erased and reprogrammed. Generally, as a nonvolatile memory, a flash memory may maintain stored data even when power is cut off. Storage devices including flash memory (e.g., such as an embedded multi-media card (eMMC), a universal flash storage (UFS), a solid state drive (SSD), a memory card, etc.) may be widely used for various systems and applications. In some aspects, storage devices may be used to efficiently store or move a large amount of data. There is a need in the art for devices, systems, and techniques that improve reliability of storage devices.

SUMMARY

An example embodiment of the present disclosure is to provide a storage device performing authentication, firmware validation, and firmware updates between devices, a storage system having the same and a method of operating the same.

According to an example embodiment of the present disclosure, a method of operating a storage device includes transmitting an authentication request message to another storage device; receiving a certificate signed with a private key of another storage device from another storage device; reading a public key of another storage device from a blockchain ledger; and decrypting the signed certificate with the public key.

According to an example embodiment of the present disclosure, a storage device includes at least one nonvolatile memory device including a plurality of memory blocks having a plurality of memory cells connected to wordlines and bitlines, the at least one nonvolatile memory device configured to store a blockchain ledger in at least one of the plurality of memory blocks. The storage device also includes a controller configured to control the at least one nonvolatile memory device, receive a device authentication request message from an external device, read the blockchain ledger from the at least one nonvolatile memory device, transmit authentication information corresponding to the blockchain ledger to the external device in response to the device authentication request, and perform an authentication operation with another device using the blockchain ledger.

According to an example embodiment of the present disclosure, a storage system includes a first storage device configured to store a blockchain ledger; and a second storage device configured to store the blockchain ledger, wherein the first storage device is configured to authenticate the second storage device by transmitting an authentication request message to the second storage device, receiving a certificate corresponding to the authentication request message from the second storage device, reading a public key of the second storage device in the blockchain ledger, and decrypting the certificate using the public key.

According to an example embodiment of the present disclosure, a storage system includes a host device configured to store a blockchain ledger; a switch device connected to the host device and configured to store the blockchain ledger; and a plurality of devices connected to the switch device and configured to store the blockchain ledger, wherein at least one device of the plurality of devices is configured to perform offloading of the host device using the blockchain ledger.

According to an example embodiment of the present disclosure, a method of operating a storage system includes determining whether a storage device is connected to a switch device in a host device; requesting device information from the storage device when the storage device is newly connected to the switch device; attesting the storage device among the host device, the switch device, and another devices by comparing the device information with information stored in a blockchain ledger; and writing device information of the storage device in the blockchain ledger based on a blockchain consensus method after attestation performed on the storage device is completed.

According to an example embodiment of the present disclosure, a method of operating a host device includes performing an authentication operation on a storage device using a blockchain; and performing an attestation operation on firmware operating on the storage device using the blockchain.

According to an example embodiment of the present disclosure, a method of operating a first storage device connected to a host device through a switch device includes performing an authentication operation on a second storage device connected to the host device through the switch device, wherein the authentication operation is performed based at least in part on a private key of the second storage device and public key of the second storage device stored in a blockchain; updating firmware operating on the second storage device when a difference between a measurement value received from the second storage device and an expected measurement value stored in the blockchain exceeds a threshold, wherein the measurement value received from the second storage device is based at least in part on a firmware version operating on the second storage device; and sharing a new blockchain ledger amongst the first storage device and the second storage device, wherein the new blockchain ledger reflects the updated firmware.

BRIEF DESCRIPTION OF DRAWINGS

The above and other aspects, features, and advantages of the present disclosure will be more clearly understood from the following detailed description, taken in combination with the accompanying drawings, in which.

DETAILED DESCRIPTION

Flash memory is an electronic (solid-state) non-volatile computer storage medium that can be electrically erased and reprogrammed. Generally, as a nonvolatile memory, a flash memory may maintain stored data even when power is cut off. Storage devices including flash memory (e.g., such as an embedded multi-media card (eMMC), a universal flash storage (UFS), a solid state drive (SSD), a memory card, etc.) may be widely used for various systems and applications. In some aspects, storage devices may be used to efficiently store or move a large amount of data.

Moreover, blockchain technology is an emerging technology that enables decentralization of data and information based on various consensus algorithms. Numerous applications are being proposed that may benefit from blockchain technology's immunity against modification and manipulation. In some aspects, a blockchain may refer to a data management technique in which persistently increasing data are recorded in blocks of a specific unit, and where each node constituting a peer-to-peer P2P network may connect and manage the blocks like a chain or connect and manage data itself in which the blocks are connected like a chain. In some aspects, the data connected like a chain is operated in the form of a distributed ledger at each node without a central system.

As described in more detail herein, one or more aspects of the present disclosure may provide for improved storage devices and systems via implementation of blockchain networks. In some cases, a storage device itself may be a node of a blockchain network, or a system including a storage device may be a node of a blockchain network. One or more aspects of the present disclosure provide for attestation of firmware (e.g., qualification verification to identify whether the firmware is operating normally) performed using the blockchain. Further, one or more aspects of the present disclosure describe techniques for performing device authentication between devices, for performing qualification verification for firmware, for performing firmware updates, etc.

Hereinafter, embodiments of the present disclosure will be described as below with reference to the accompanying drawings.

Storage devices, storage systems having the same, and methods of operating the same in one or more example embodiments may perform device authentication (e.g., using a blockchain), may perform attestation on firmware operating in a device, etc., according to one or more aspects of the present disclosure.

Figure 1:
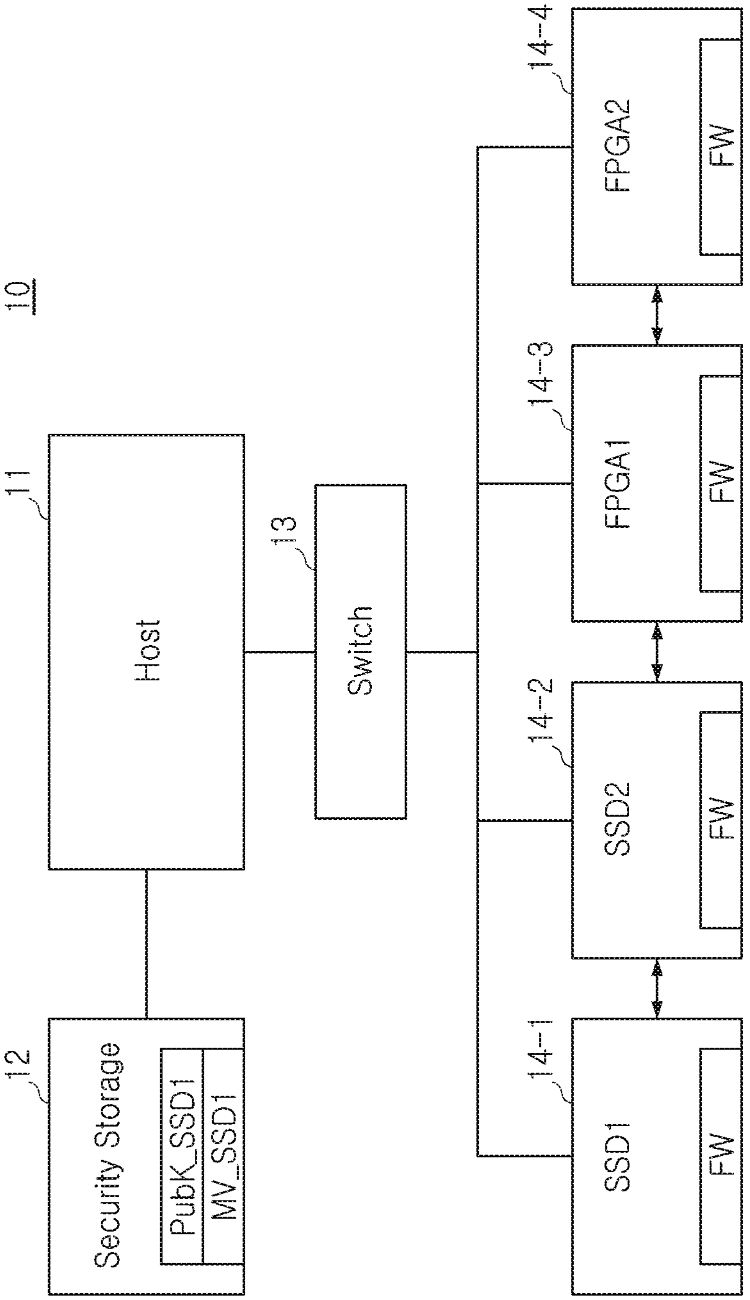
FIG. 1 is a diagram illustrating a general storage system according to one or more aspects of the present disclosure.

FIG. 1 is a diagram illustrating a general storage system 10. Referring to FIG. 1, the storage system 10 may include a host device 11, a secure storage device 12 (e.g., security storage 12), a switch device 13, and devices 14-1, 14-2, 14-3, and 14-4.

In computing, firmware may include or refer to a specific class of computer software that may enable low-level control of specific hardware for a device. For instance, firmware, such as the basic input/output system (BIOS) of a personal computer, may contain basic functions of a device, and may provide hardware abstraction services to higher-level software such as operating systems. A BIOS component may be a software component that includes BIOS operated as firmware, which may initialize and run various hardware components. A BIOS component may also manage data flow between a processor and various other components, e.g., peripheral components, input/output control component, etc. A BIOS component may include a program or software stored in ROM, flash memory, or any other non-volatile memory. In some aspects, the term "firmware" may include, or may refer to, operating software and/or supervisory software or other software that may be executed on, or within, a device controller to which entities outside the device may not have visibility towards.

Generally, the host device 11 may check whether a firmware executed in the devices 14-1 to 14-4 created by a vendor is operating normally. The host device 11 may include a secure storage device 12 for storing values measured during normal operation of the devices 14-1 to 14-4. Thereafter, the host device 11 may request a corresponding measurement value when the device is executing a firmware. The host device 11 may attest whether the firmware is operating normally by comparing the measurement value received from the device with a value stored in the secure storage device 12. The attesting of whether the firmware is operating normally may be referred to as "attestation."

Generally, such attestation may be performed after first performing authentication on a device. For example, the host device 11 may perform an authentication procedure (e.g., beginning with the sending of an authentication request message) with the first storage device 14-1, SSD1. The first storage device SSD1 may sign a certificate with a private key in response to the authentication request received from the host device 11, and the first storage device SSD1 may transmit the signed certificate to the host device 11. The host device 11 may confirm that the certificate signature is of the first storage device SSD1 by decrypting the signed certificate using a public key PubK_SSD1 of the first storage device SSD1 stored in the secure storage device 12.

After the authentication operation is completed, an attestation operation may be performed. The host device 11 may request one or more firmware measurement values from the first storage device SSD1 to attest whether the firmware is operating normally in the first storage device SSD1. The first storage device SSD1 may measure a related value while driving the firmware in response to the attestation request, and the first storage device SSD1 may transmit the measurement value to the host device 11. The host device 11 may compare the measurement value transferred from the first storage device SSD1 with the measurement value MV_SSD1 already stored in the secure storage device 12 to determine whether the firmware running on the first storage device SSD1 is operating normally. For example, when the measurement value and the stored value MV_SSD1 match, the host device 11 may determine that the firmware of the first storage device SSD1 is operating normally.

As for the general attestation method, as the secure storage device 12 is provided (e.g., as a public key PubK_SSD1 and a measurement value MV_SSD1 are stored in the secure storage device 12 and used for attestation operations), hacking to the secure storage device 12 may also be defended against and prevented. In some cases, only the host device 11 may perform authentication and attestation on each device. As for a system having a device supporting an offloading operation, each device may implement a complicated procedure for authentication and attestation via a host device 11.

Storage systems in described example embodiments may include a device performing offload from a host device, and storage systems may perform authentication, attestation, and firmware update between devices using a blockchain technique, as described in more detail herein.

A storage system in an example embodiment may include a device which may perform device authentication, may perform attestation on a normal operation of firmware, and/or may perform firmware update (e.g., by comparing a public key of firmware of a device, a measurement value during normal operation, a public key of a host device and a device writing a firmware version in the blockchain ledger, a measurement value during normal operation, and a value received by requesting firmware version with a ledger value of the blockchain).

It may not be necessary for the storage system in some example embodiments to include another secure storage device (e.g., such that management costs may be reduced). Also, the storage system in an example embodiment may reduce a load of the host device by performing authentication, attestation, or firmware update between devices (e.g. without hardware involvement).

Figure 2:
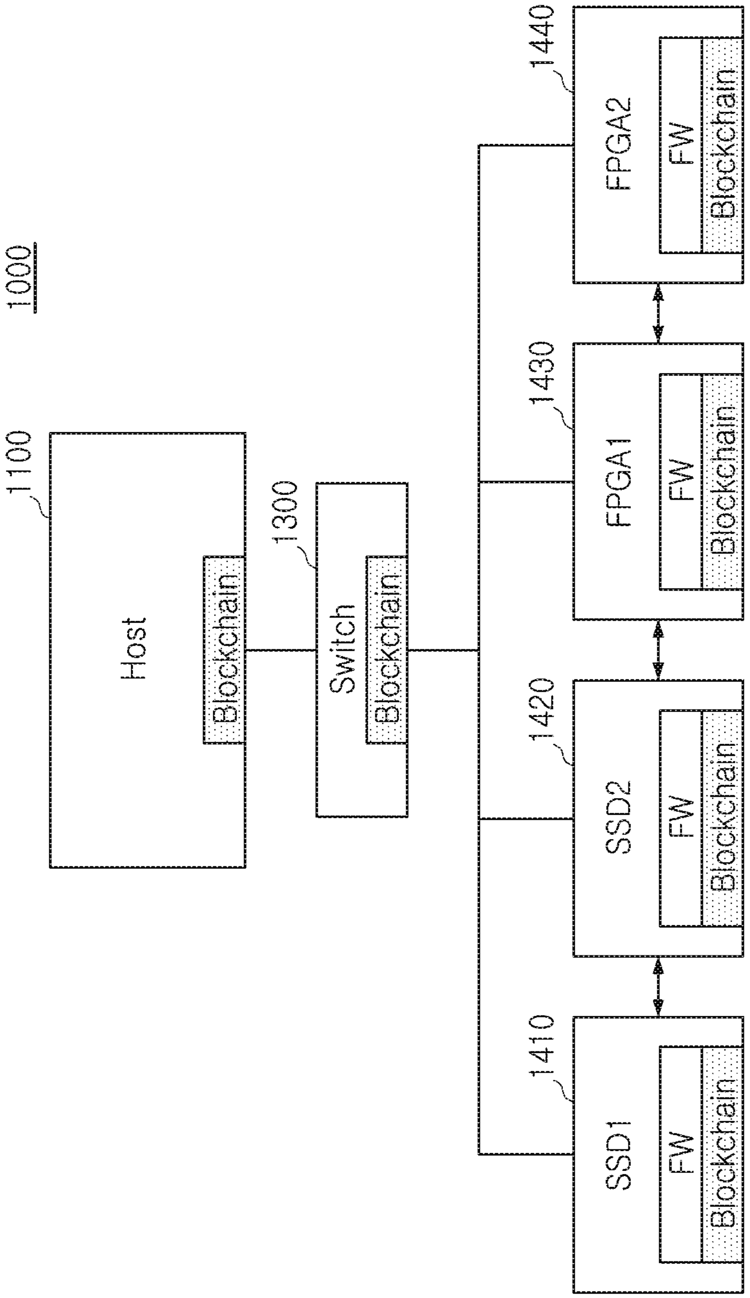
FIG. 2 is a diagram illustrating a storage system according to one or more aspects of the present disclosure.

FIG. 2 is a diagram illustrating a storage system 1000 according to one or more aspects of the present disclosure. Referring to FIG. 2, the storage system 1000 may include a host device 1100, a switch device 1300, and devices 1410, 1420, 1430, and 1440.

The host device 1100 may be connected to the plurality of devices 1410, 1420, 1430, and 1440 through the switch device 1300. In an example embodiment, at least one of the plurality of devices 1410, 1420, 1430, and 1440 may include a storage device performing offloading of the host device 1100 using a blockchain ledger.

The host device 1100 may directly perform device authentication or attestation. Simultaneously, the host device 1100 may offload these functions (device authentication and attestation) to each of the devices 1410, 1420, 1430, and 1440. For example, each of the devices 1410, 1420, 1430, and 1440 may perform an attestation operation using a blockchain to determine whether another device (e.g., another device from the group of devices 1410, 1420, 1430, and 1440) is a legitimate device when transmitting data, updating firmware, or reconnection to another device.

For example, when multiple devices are replaced in the server or when a new blockchain creation event such as firmware update occurs in multiple devices, multiple blockchains may be created competitively. The blockchains may be linked by referencing different blockchains or the same blockchain. Also, blockchain attestation may be performed by specific major devices (e.g., such as a host device, security device, field programmable gate array (FPGA), accelerator, switch controller, SSD with excellent stability, or the like). Moreover, rather than being performed by entirety of the devices, attestation may be performed using an attested blockchain. After the attestation is completed, other devices may create (e.g., create blockchain blocks, chains, etc.) later and may connect the blockchain. In an example embodiment, the multiple blockchains may create a blockchain by branching the blockchains simultaneously.

Thereafter the blockchain may continuously create chains, and the blockchain occupying the majority (i.e., the blockchain with the longest branch) may survive. A small number of blockchains may be written to a newly created blockchain on a plurality of blockchains. In some aspects, the described series of processes may be referred to as a consensus process. However, the consensus process in the example embodiment is not limited thereto, and other consensus processes may be used by analogy, without departing from the scope of the present disclosure.

When load of tasks of one of the storage devices is exceeded after the authentication operation or attestation, or when fast processing by performing tasks in parallel with other devices is desired, the storage device may offload the tasks thereof to another device which has been authenticated or qualification-attested.

In some example embodiments, the switch device 1300 may transmit data to and receive data from the host device 1100 and the devices 1410, 1420, 1430, and 1440 through a peripheral component interconnect express (PCIe) interface.

However, example embodiments are not limited to such a PCIe interface. Example embodiments may be implemented with various interfaces supporting a peer-to-peer interface.

In an example embodiment, the devices 1410, 1420, 1430, and 1440 may include storage devices 1410 (SSD1) and 1420 SSD2. In an example embodiment, the devices 1410, 1420, 1430, and 1440 may include arithmetic processing units 1430 (FPGA1) and 1440 (FPGA2). The number of devices 1410, 1420, 1430, and 1440, the number of storage devices, or the number of arithmetic processing units illustrated in FIG. 2 are shown for exemplary purposes, and are not intended to be limiting in terms of the scope of the present disclosure.

For instance, a given computer system may include various devices (e.g., hardware devices. such as other semiconductor components that may be present via add-in cards, advanced graphics processing cards, networking cards, and other peripheral devices). In some cases, such various components (e.g., both external and internal to semiconductor devices) can include their own processing circuitry (e.g., microcontrollers, etc.) to execute intended operations according to a firmware or other supervisory software. In some aspects, such firmware may not be accessible to security monitoring software (e.g., antivirus software). As a result, in some cases, malicious software may persist as firmware within such hardware devices, and may be difficult to detect (e.g., out of sight) by security measures such as security monitoring software. Accordingly, it may be possible for certain threats to compromise a computer system via firmware.

Systems and techniques described herein may be implemented to efficiently and reliably inquire as to the integrity of firmware executing within various hardware devices (e.g., such as by performing attestation operations on firmware operating on devices 1410, 1420, 1430, and 1440, as described in more detail herein).

The host device 1100, the switch device 1300, and the devices 1410, 1420, 1430, and 1440 may share a blockchain ledger. The blockchain ledger may include public keys of the host device 1100 and the devices 1410, 1420, 1430, and 1440, and measurement values during a normal firmware operation.

The ledger of the blockchain may include blockchain blocks. Each of the blockchain blocks may be created based on a consensus algorithm. For example, as the consensus algorithm, proof of work (PoW), proof of stake (PoS), delegated proof of stake (DPoS), proof of trading (PoT), proof of burn (PoB), proof of storage, proof of elapsed time (PoET), byzantine fault tolerance (BFT), practical byzantine fault tolerance (PBFT), Paxos, a raft consensus algorithm, etc. may be used. In the description below, it may be assumed that a blockchain block may be created using a PoW consensus algorithm. In an example embodiment, when a storage device (e.g., SSD or FPGA) is attached (e.g., connected) or firmware is updated, a blockchain block may be created using a PoW consensus algorithm. The blockchain block may include the entire firmware data or a hash value of specific measurement data when the firmware is executed. The hashed value may be calculated using a hash function. In an example embodiment, the hash function may be implemented as one of a CRC-32 function, an MD2 function, an MD4 function, an MD5 function, a SHA-1 function, a SHA-256 function, a SHA-384 function, a SHA-512 function, a HAVAL function, etc.

In some aspects, a measurement during normal operation of firmware of a device (e.g., used for performing attestation operations on firmware operating on devices 1410, 1420, 1430, and 1440) may generally include execution of any measurement code, which may be affected by firmware operating on the measuring device, where measurement information is recorded by the device (e.g., and where the measurement information, or measurement value, may be sent from the measuring device to another device requesting the recorded measurement value for authentication operations, attestation operations, etc.).

In some cases, measurement during normal operation of firmware of a device may include a pointer measurement and/or a pointer analysis (e.g., of whether any pointer references a location external to the measured device firmware).

In some cases, measurement during normal operation of firmware of a device may include execution of integrity logic of the measuring device, for example, including performing cryptographic measurements (e.g., a hash or a HMAC) of the currently executing/active firmware program code used by the measuring devices internal microcontroller (s).

Figure 3:
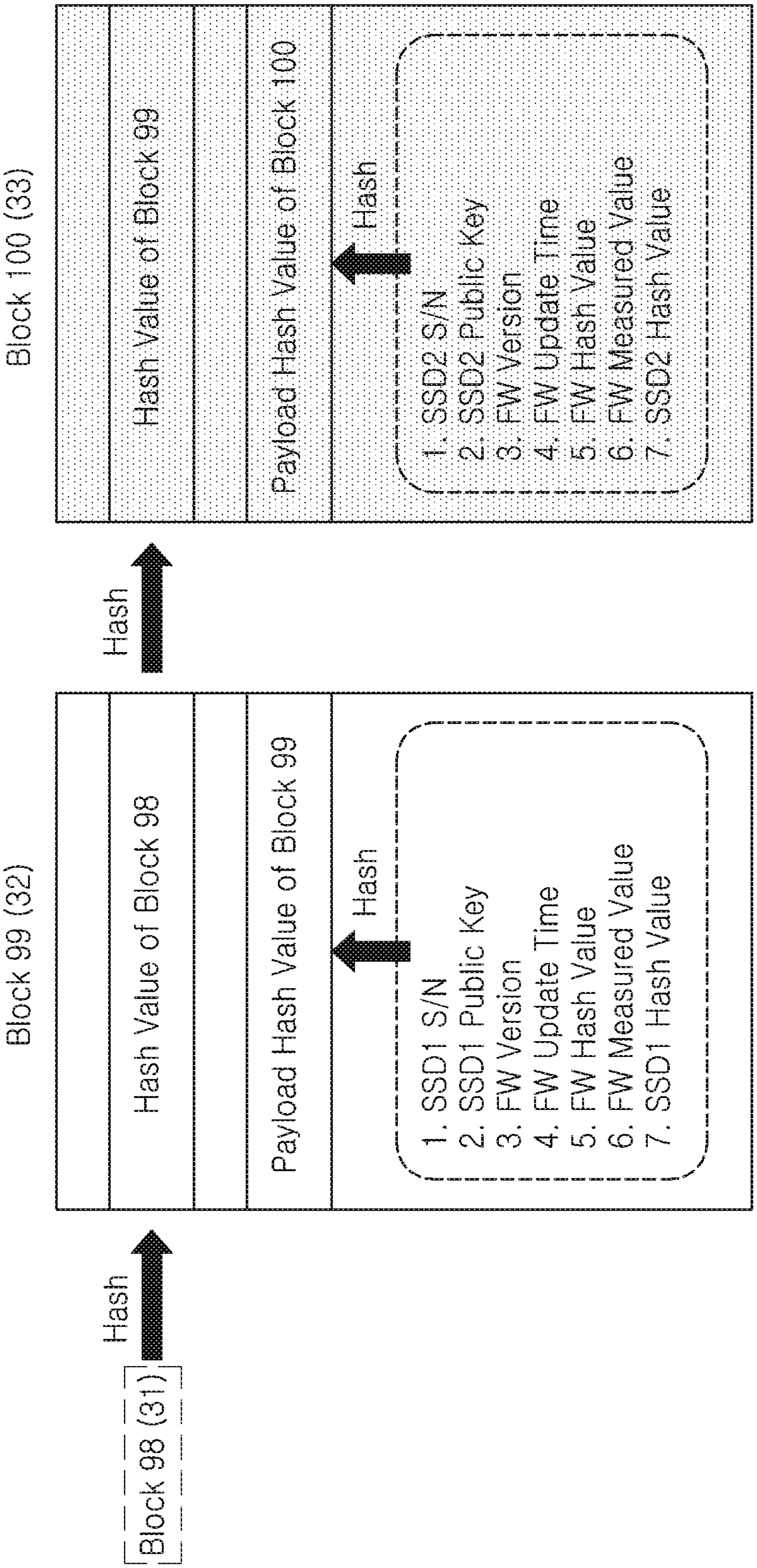
FIG. 3 is a diagram illustrating a blockchain block according to one or more aspects of the present disclosure.

FIG. 3 is a diagram illustrating a blockchain block according to one or more aspects of the present disclosure. In the example of FIG. 3, two blockchain blocks 32 and 33 are illustrated.

The 99th blockchain block 32 may store values corresponding to the first storage device SSD1. The 99th blockchain 32 may include a header and a payload. In an example embodiment, the header may include a hash value of the 98th blockchain block 31 which may be a previous blockchain block, and a payload hash value of the current blockchain block 32. The payload hash value may refer to a hash value for the payload. In some examples, the payload may include a serial number (S/N) of the first storage device SSD1, a public key of the first storage device SSD1, a firmware version, a firmware update time, a hash value of the firmware, a measurement value during normal operation of the firmware, and a hash value of the first storage device SSD1.

Further, in some cases, the payload may further include various pieces of information, such as, for example, a device manufacturer, a manufacturing date, capacity, an SSD health status, and an initial connected time.

The 100th blockchain block 33 may store values corresponding to the second storage device SSD2. The 100th blockchain block 33 may include a header and a payload. In an example embodiment, the header may include a hash value of the previous 99th blockchain block 32 and a payload hash value of the current blockchain block 33. In the example of FIG. 3, the payload may include a serial number (S/N) of the second storage device SSD2, a public key of the second storage device SSD2, a firmware version, a firmware update time, a hash value of the firmware, a measurement value during normal operation of the firmware, and a hash value of the second storage device SSD2.

Figure 4:
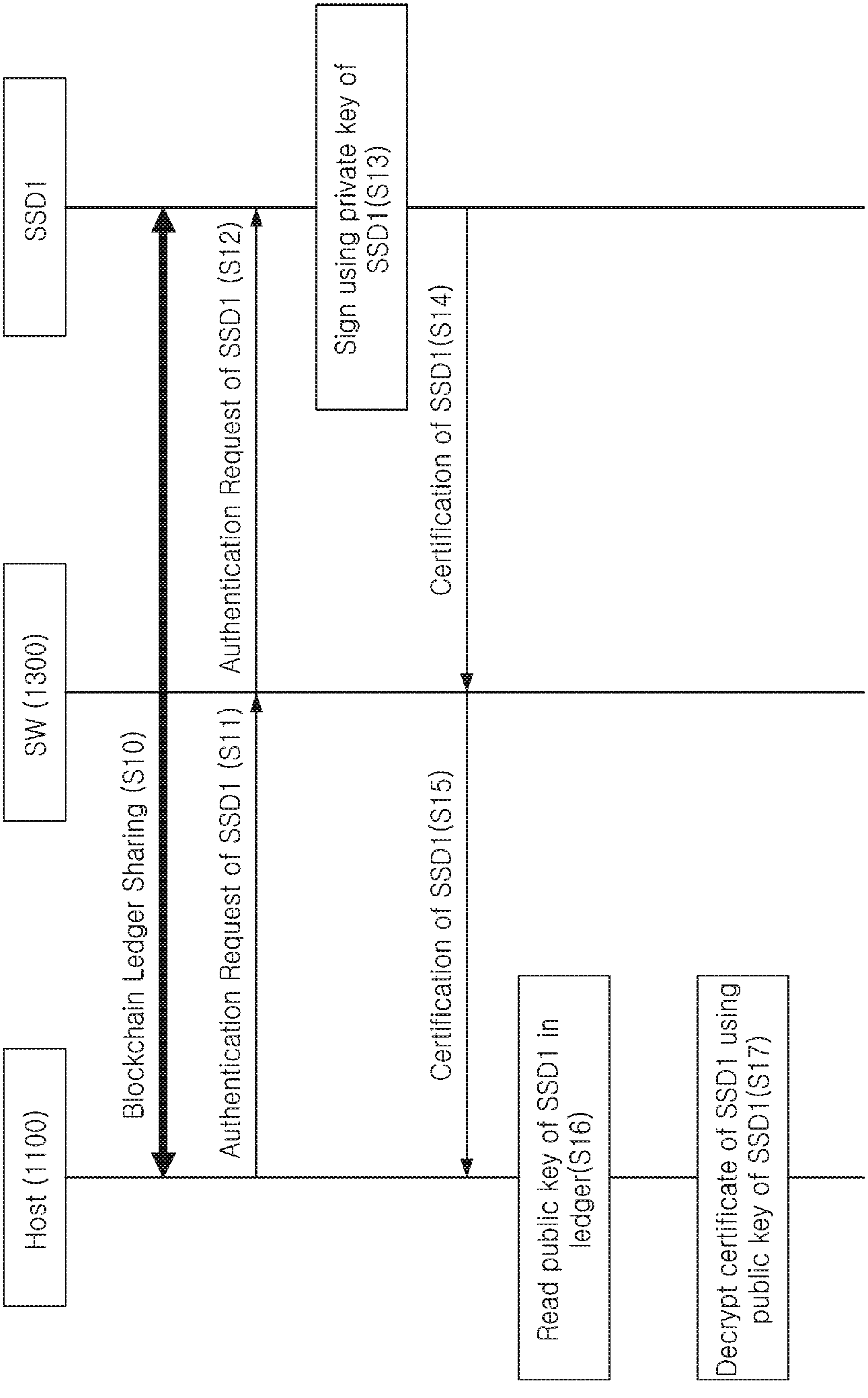
FIG. 4 is a ladder diagram illustrating a device authentication operation in a storage system according to one or more aspects of the present disclosure.

FIG. 4 is a ladder diagram illustrating a device authentication operation in the storage system 1000 according to an example embodiment. Referring to FIGS. 2-4, the device authentication operation in the host device 1100 may be performed as described herein.

The host device 1100, the switch device 1300, and the first storage device SSD1 may share (e.g., communicate, exchange, confirm, etc.) a blockchain ledger (S10). The host device 1100 may issue an authentication request message of the first storage device SSD1 and may transmit the message to the switch device 1300 (S11). The switch device 1300 may transmit the authentication request message of the first storage device SSD1 to the first storage device SSD1 (S12). The first storage device SSD1 may sign the authentication-related information with a private key of the first storage device SSD1 in response to the authentication request message (S13). The signed certificate may serve (e.g., may work) as an authentication for authentication-related information. The authentication-related information may include specification information of the first storage device SSD1. The described certificate signing process may be performed as described herein. The first storage device SSD1 may generate a hash for authentication-related information. The first storage device SSD1 may encrypt the generated hash value using the private key. The first storage device SSD1 may generate a signed certificate having an encrypted hash value and authentication-related information.

The first storage device SSD1 may transmit the signed certificate to the switch device 1300 (S14). The switch device 1300 may transmit the signed certificate to the host device 1100 (S15). The host device 1100 may read the public key of the first storage device SSD1 from the blockchain ledger (S16). The host device 1100 may decrypt the signed certificate using the public key of the first storage device SSD1 (S17). The signed certificate may include an encrypted hash value and authentication-related information. The host device 1100 may decrypt the encrypted hash value with a public key of the first author device SSD1. Also, the host device 1100 may generate a hash value for authentication-related information. In an example embodiment, when authentication-related information from the decrypted certificate is identified, the host device 1100 may authenticate the first storage device SSD1 as a legitimate connection device.

After the authentication operation on the first storage device SSD1, an attestation operation may be performed on the firmware.

Figure 5:
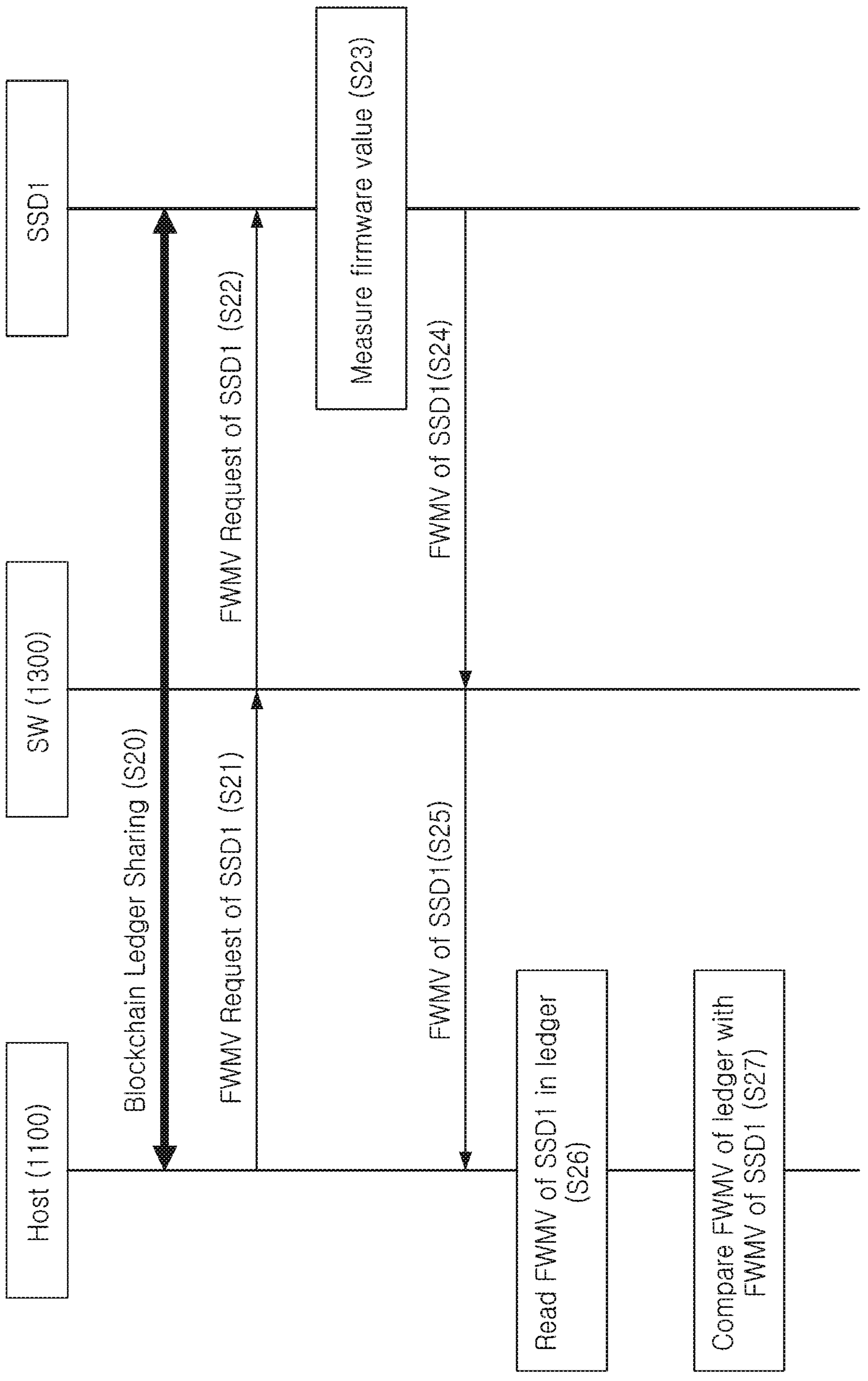
FIG. 5 is a ladder diagram illustrating firmware attestation operation in a storage system according to one or more aspects of the present disclosure.

FIG. 5 is a ladder diagram illustrating firmware attestation operation in the storage system 1000 according to one or more aspects of the present disclosure. For example, referring to FIGS. 2-5, the attestation operation on the normal operation of the firmware performed in the first storage device SSD1 may be performed as described herein.

The host device 1100, the switch device 1300, and the first storage device SSD1 may share (e.g., communicate, exchange, confirm, etc.) a blockchain ledger (S20). The host device 1100 may issue a request for the firmware measurement value FWMV of the first storage device SSD1 and may transmit the value to the switch device 1300 (S21). The switch device 1300 may transmit the firmware measurement value FWMV request from the host device 1100 to the first storage device SSD1 (S22). The first storage device SSD1 may drive the firmware in response to the request for the firmware measurement value FWMV and the first storage device SSD1 may measure a value according to the driving result (S23). The first storage device SSD1 may transmit the firmware measurement value FWMV of the first storage device SSD1 to the switch device 1300 (S24). The switch device 1300 may transmit the firmware measurement value FWMV of the first storage device SSD1 to the host device 1100 (S25). The host device 1100 may read the firmware measurement value of the first storage device SSD1 from the blockchain ledger (S26). The host device 1100 may compare the firmware measurement value read from the blockchain ledger with the firmware measurement value transmitted from the first storage device SSD1 (S27). When the firmware measurement value read from the blockchain ledger and the firmware measurement value transmitted from the first storage device (SSD1) match (e.g., or when a difference value according to the result of comparison is within a predetermined range or threshold), the host device 1100 may determine that the firmware of the storage device SSD1 is operating normally.

The storage system 1000 in an example embodiment may perform mutual authentication between the devices.

Figure 6:
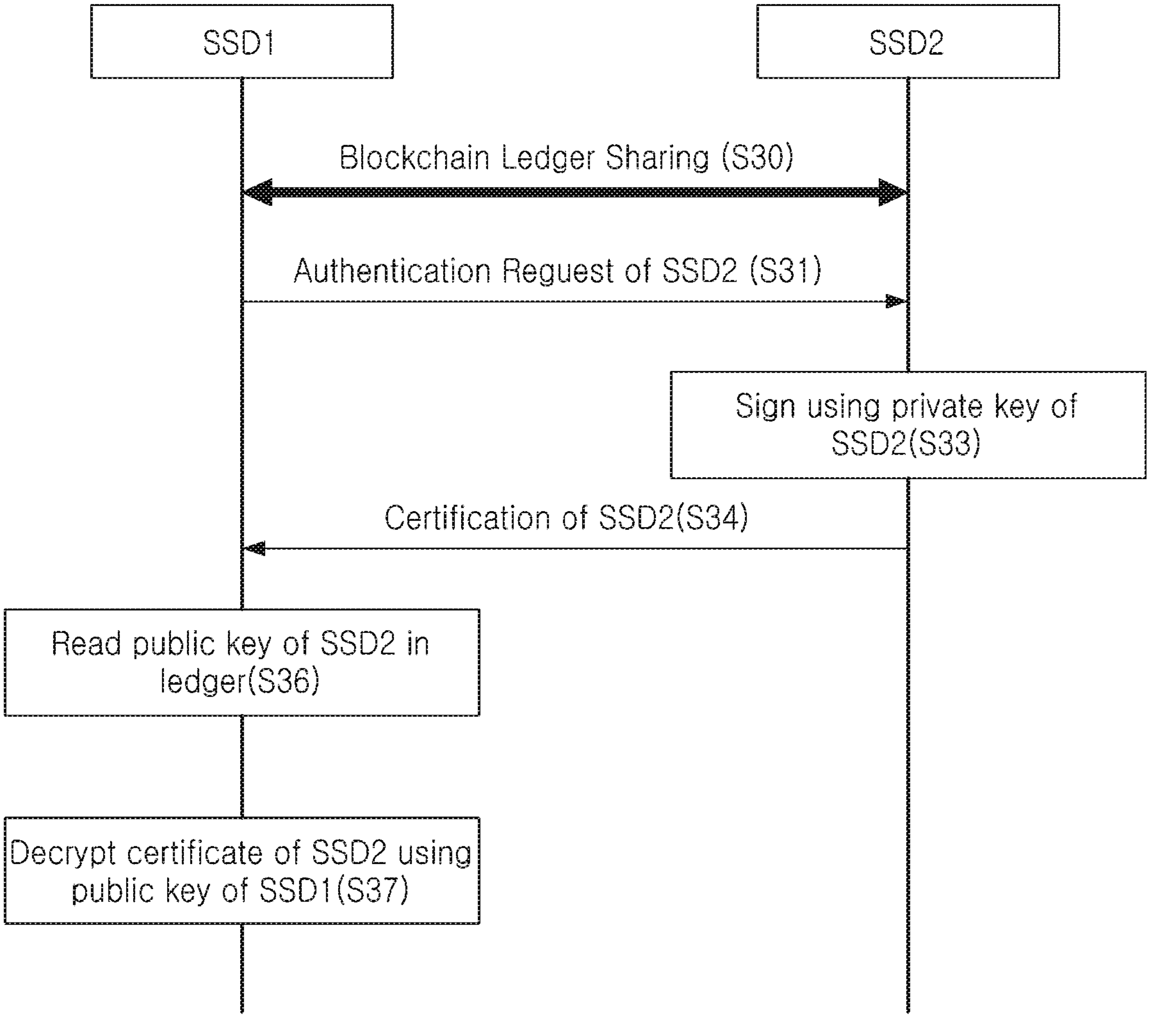
FIG. 6 is a ladder diagram illustrating a device authentication operation in a storage device of a storage system according to one or more aspects of the present disclosure.

FIG. 6 is a ladder diagram illustrating a device authentication operation in a storage device of a storage system according to one or more aspects of the present disclosure. For example, referring to FIGS. 2-6, the authentication operation between devices may be performed as described herein.

The first storage device SSD1 and the second storage device SSD2 may share (e.g., communicate, exchange, confirm, etc.) a blockchain ledger (S30). The first storage device SSD1 may transmit an authentication request message for the second storage device SSD2 to the second storage device SSD2 (S31). The second storage device SSD2 may sign the authentication request message with a private key thereof in response to the authentication request (S33). The second storage device SSD2 may transmit the signed certificate to the first storage device SSD1 (S34). The first storage device SSD1 may read the public key of the second storage device SSD2 from the blockchain ledger (S36). The first storage device SSD1 may decrypt the signed certificate using the public key of the second storage device SSD2 (S37). When authentication-related information from the decrypted certificate is identified (e.g., and validated or confirmed), the first storage device SSD1 may authenticate the second storage device SSD2 as a legitimate connection device.

In the example of FIG. 6, the device authentication may be performed using a public key. However, example embodiments are not limited thereto. For instance, some storage systems in some example embodiments may perform device authentication using history information stored in the blockchain ledger. Moreover, device authentication may be performed using other techniques by analogy, for example, without departing from the scope of the present disclosure.

Figure 7:
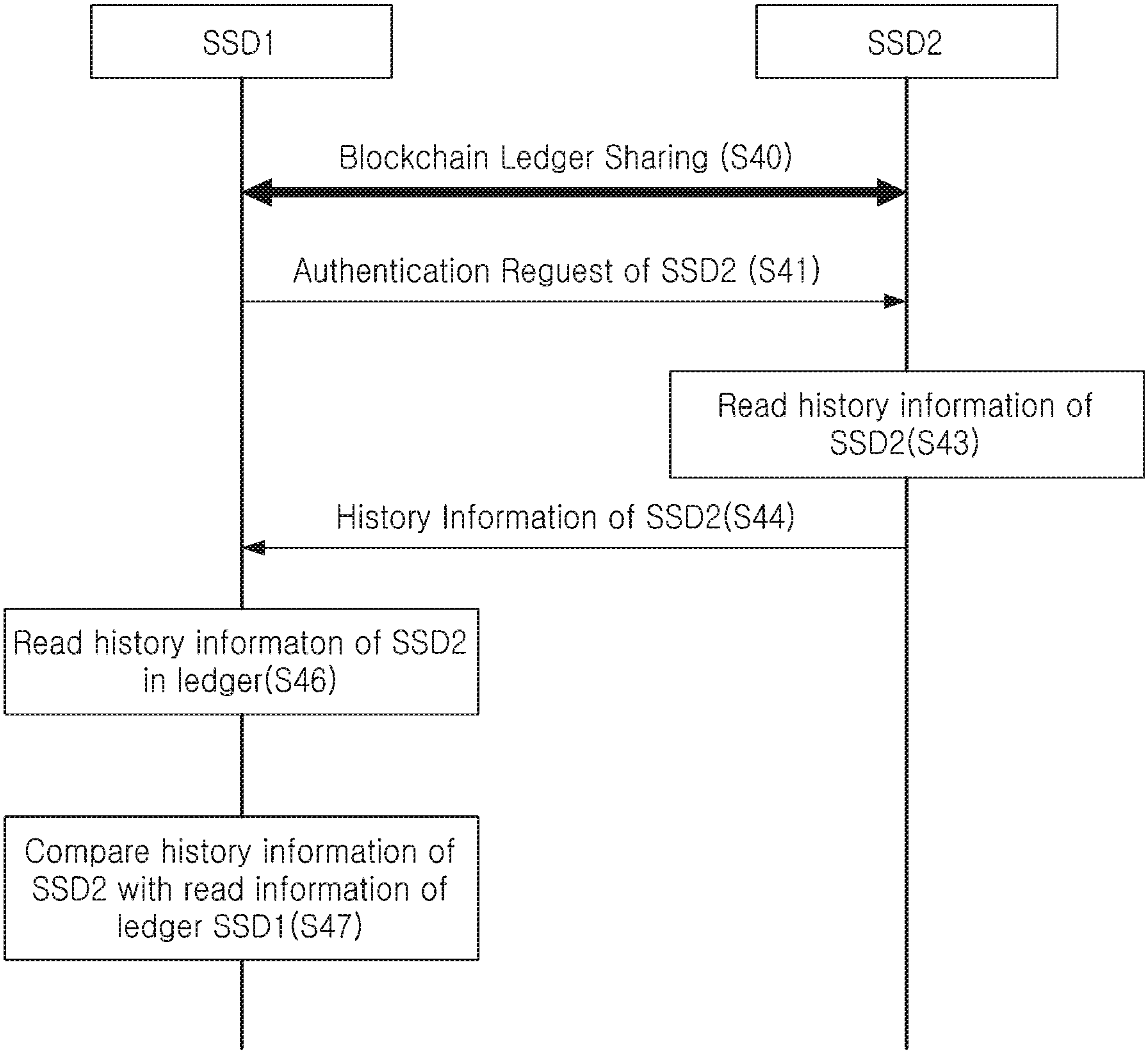
FIG. 7 is a ladder diagram illustrating a device authentication operation in a storage device of a storage system according to one or more aspects of the present disclosure.

FIG. 7 is a ladder diagram illustrating a device authentication operation in a storage device of a storage system according to another example embodiment. Referring to FIGS. 2-5 and 7, the authentication operation between devices may be performed as described herein.

The first storage device SSD1 and the second storage device SSD2 may share (e.g., communicate, exchange, confirm, etc.) a blockchain ledger (S40). The first storage device SSD1 may transmit an authentication request message for the second storage device SSD2 to the second storage device SSD2 (S41). The second storage device SSD2 may read history information thereof in response to the authentication request (S43). In some examples, such history information may include at least one of a device manufacturer, a manufacturing date, capacity, an S/N and firmware creation date, a firmware version, a firmware update date, a firmware size, a firmware hash value, a measurement value during normal operation, an SSD health status, and an initial connection time.

The second storage device SSD2 may transmit history information to the first storage device SSD1 (S44). The first storage device SSD1 may read history information of the second storage device SSD2 from the blockchain ledger (S46). The first storage device SSD1 may compare the history information transmitted from the second storage device SSD2 with the history information read from the blockchain ledger (S47). When the history information transmitted from the second storage device SSD2 matches with the history information read from the blockchain ledger (e.g., as a result of the comparison), the first storage device SSD1 may authenticate the second storage device SSD2 as a legitimate connection device.

The storage system 1000 in an example embodiment may perform firmware attestation between devices.

Figure 8:
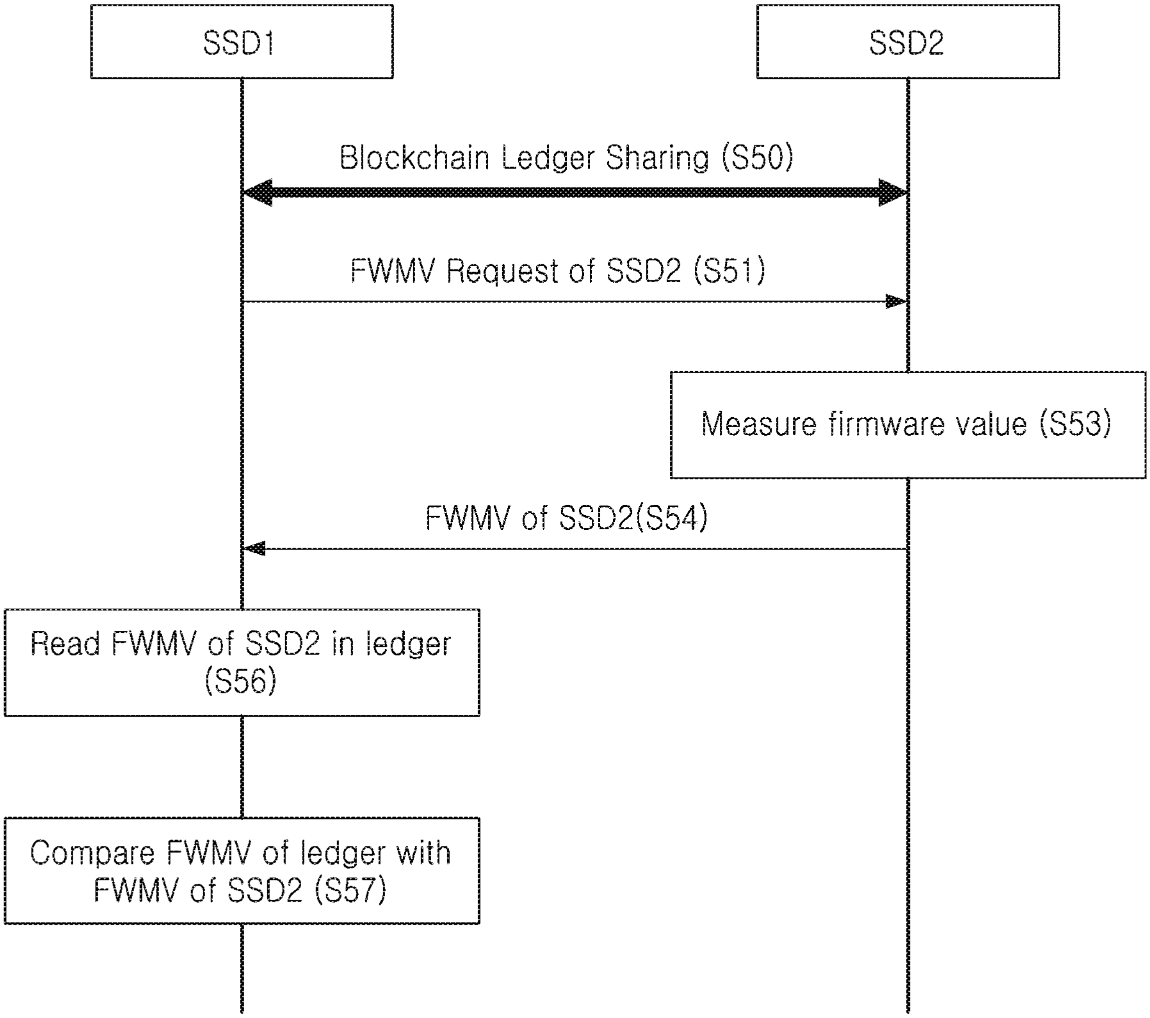
FIG. 8 is a ladder diagram illustrating one or more firmware update operations in a storage device of a storage system according to one or more aspects of the present disclosure.

FIG. 8 is a ladder diagram illustrating a firmware update operation in a storage device of the storage system 1000 according to one or more aspects of the present disclosure. Referring to FIGS. 2-8, after device authentication is completed, the firmware attestation operation may be performed as described herein.

The first storage device SSD1 and the second storage device SSD2 may share (e.g., communicate, exchange, confirm, etc.) a blockchain ledger (S50). The first storage device SSD1 may request the measurement value FWMV for firmware attestation from the second storage device SSD2 (S51). The second storage device SSD2 may measure the value by driving the firmware in response to the request for the measurement value (S53). The second storage device SSD2 may transmit the measurement value FWMV to the first storage device SSD1 (S54). The first storage device SSD1 may read the measurement value of the second storage device SSD2 from the blockchain ledger (S56). The first storage device SSD1 may compare the measurement value read from the blockchain ledger with the measurement value transmitted from the second storage device SSD2 (S57). When the measurement value read from the blockchain ledger and the measurement value transmitted from the second storage device SSD2 match (e.g., or when a difference value between the values is within a predetermined range or when a difference value between the values does not exceed a predetermined threshold), it may be determined that the firmware of the second storage device SSD2 is operating normally.

The storage system 1000 in an example embodiment may enable firmware update between devices.

Figure 9:
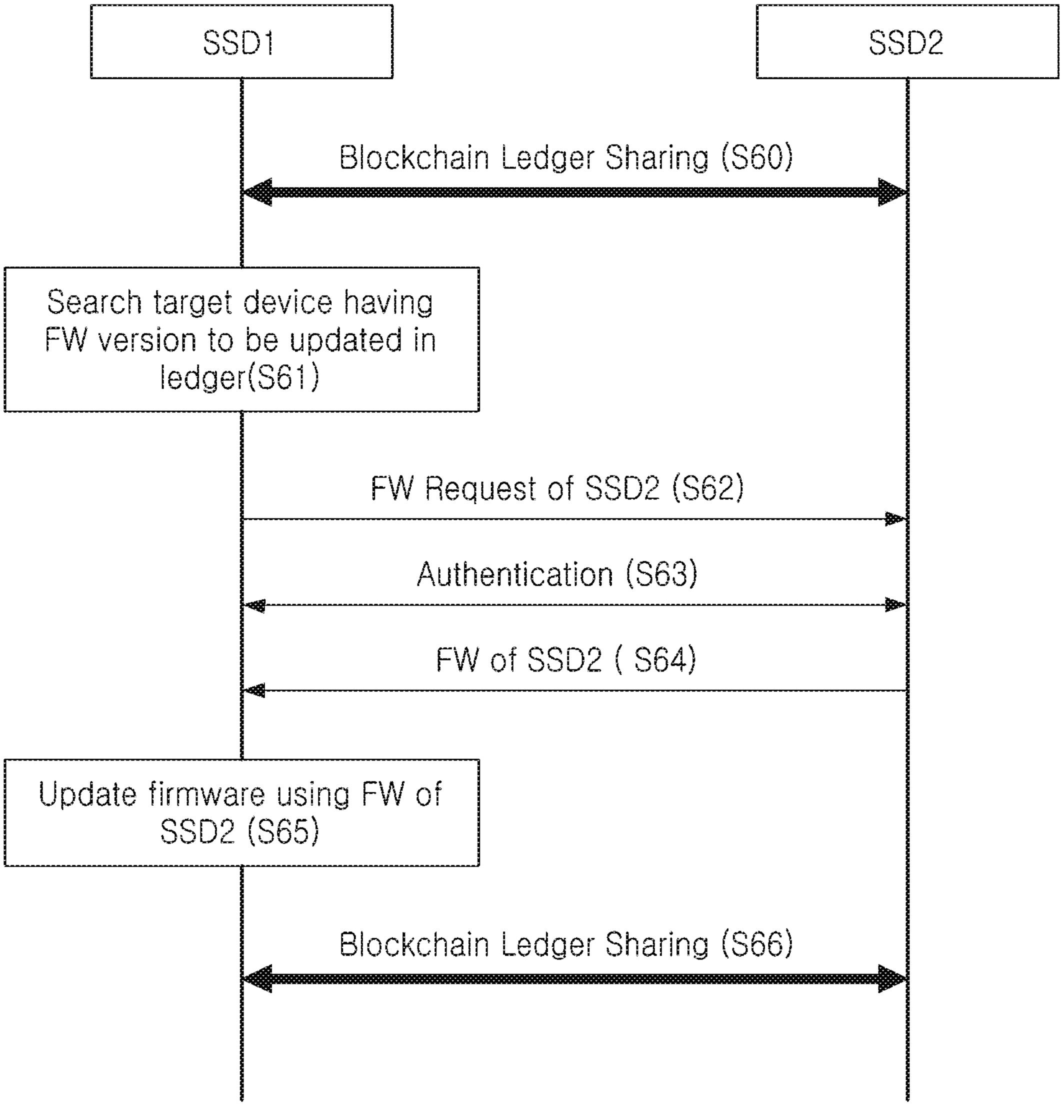
FIG. 9 is a ladder diagram illustrating one or more firmware update operations of a storage system according to one or more aspects of the present disclosure.

FIG. 9 is a ladder diagram illustrating a firmware update operation of the storage system 1000 according to one or more aspects of the present disclosure. Referring to FIGS. 2-9, a firmware update operation between devices may be performed as described herein.

The first storage device SSD1 and the second storage device SSD2 may share (e.g., communicate, exchange, confirm, etc.) a blockchain ledger (S60). The first storage device SSD1 may search for a target device having a firmware version to be updated in the blockchain ledger (S61). When the target device is the second storage device SSD2, the first storage device SSD1 may transmit a firmware request to the second storage device SSD2 (S62). The second storage device SSD2 may perform device authentication on the first storage device SSD1 in response to the firmware request (S63). As for the device authentication, in some examples, the device authentication method described in FIGS. 6 and 7 may be used. After device authentication is completed, the second storage device SSD2 may transfer the firmware thereof to the first storage device SSD1 (S64). The first storage device SSD1 may update the firmware thereof using the firmware transmitted from the second storage device SSD2 (S65). According to these firmware updates, the blockchain ledger may be changed. The changed blockchain ledger may be shared (e.g., communicated, exchanged, confirmed, etc.) by one or more of, or by the entirety of, the devices in the blockchain (S66).

Figure 10:
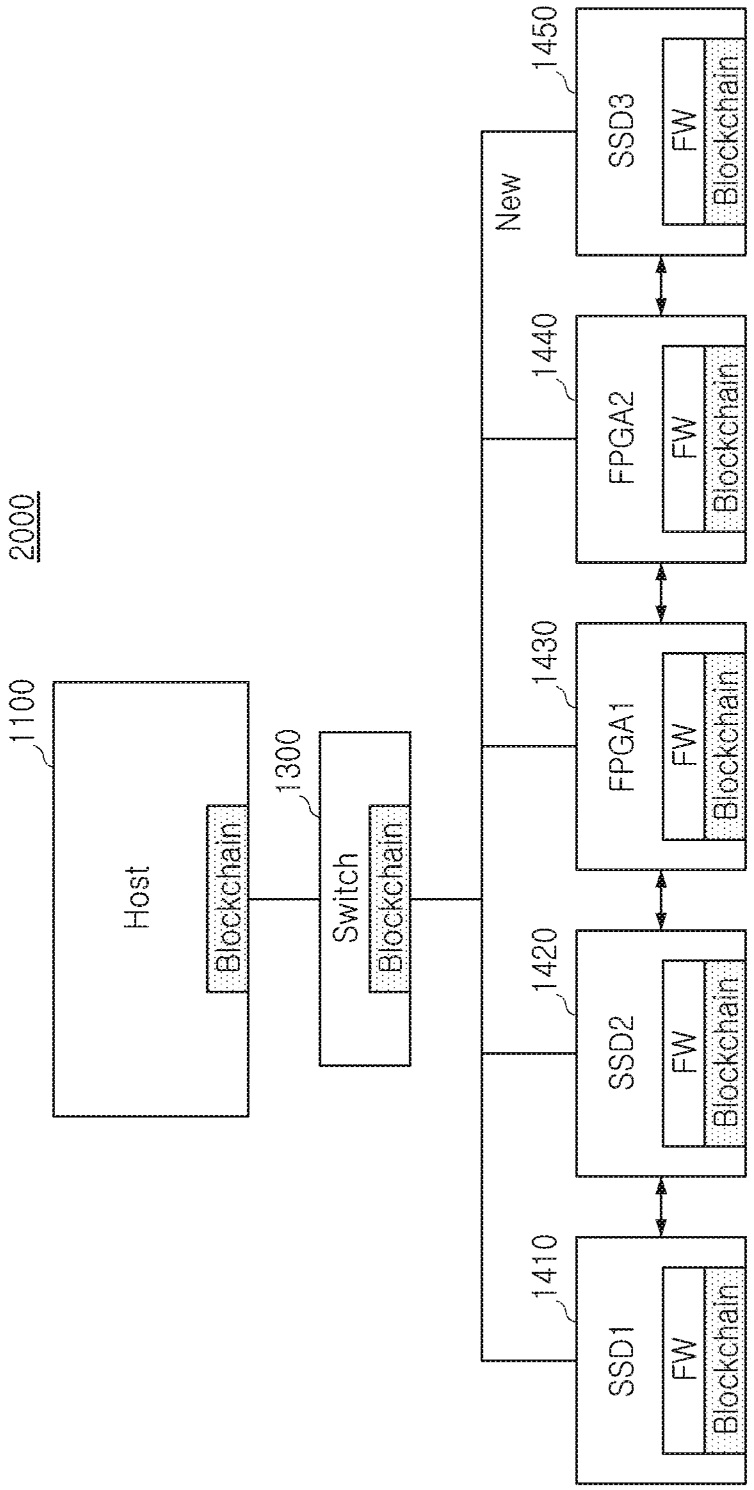
FIG. 10 is a diagram illustrating an example in which a new device is added to a storage system according to one or more aspects of the present disclosure.

FIG. 10 is a diagram illustrating an example in which a new device (e.g., SSD3 1450) is added to the storage system according to one or more aspects of the present disclosure. Referring to FIG. 10, the storage system 2000 may further include third storage device SSD3 1450 as compared to the storage system 1000 illustrated in FIG. 1.

Figure 11:
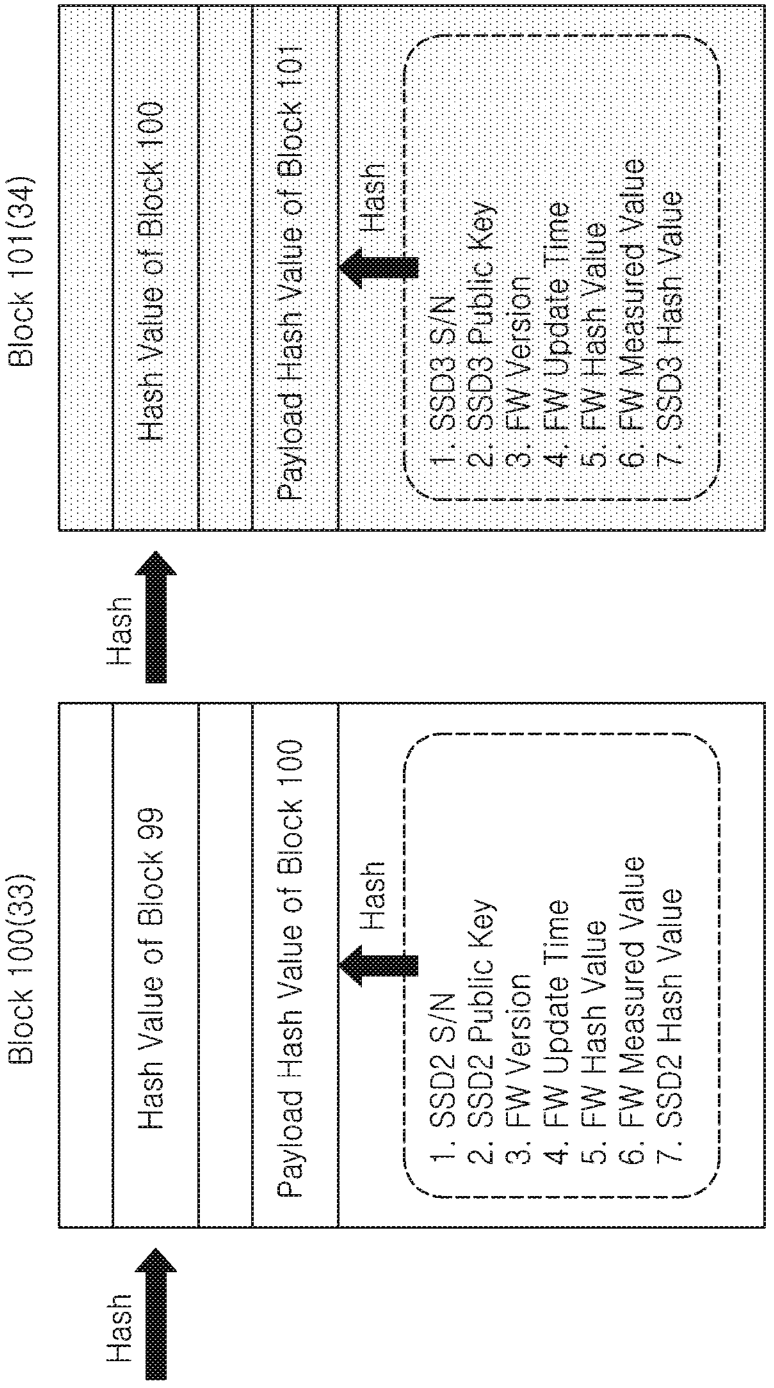
FIG. 11 is a diagram illustrating a blockchain block newly created by adding a new storage device (e.g., illustrated in FIG. 10) according to one or more aspects of the present disclosure.

FIG. 11 is a diagram illustrating a blockchain block newly created by adding the new storage device SSD3 illustrated in FIG. 10.

Referring to FIG. 11, the 101st blockchain block 33 which may be newly created may store values corresponding to the third storage device SSD3. The 101st blockchain 33 may include a header and a payload. In an example embodiment, the header may include a hash value of the previous 100th blockchain block 33 and a payload hash value of the current blockchain block 34. In the example of FIG. 11, the payload may include a serial number of the third storage device SSD3, a public key of the third storage device SSD3, a firmware version, a firmware update time, a hash value of the firmware, a measurement value during normal operation of the firmware, and a hash value of the third storage device SSD3.

In some examples, the storage device may be detached for replacement of components and may be reconnected to the storage system.

Figure 12:
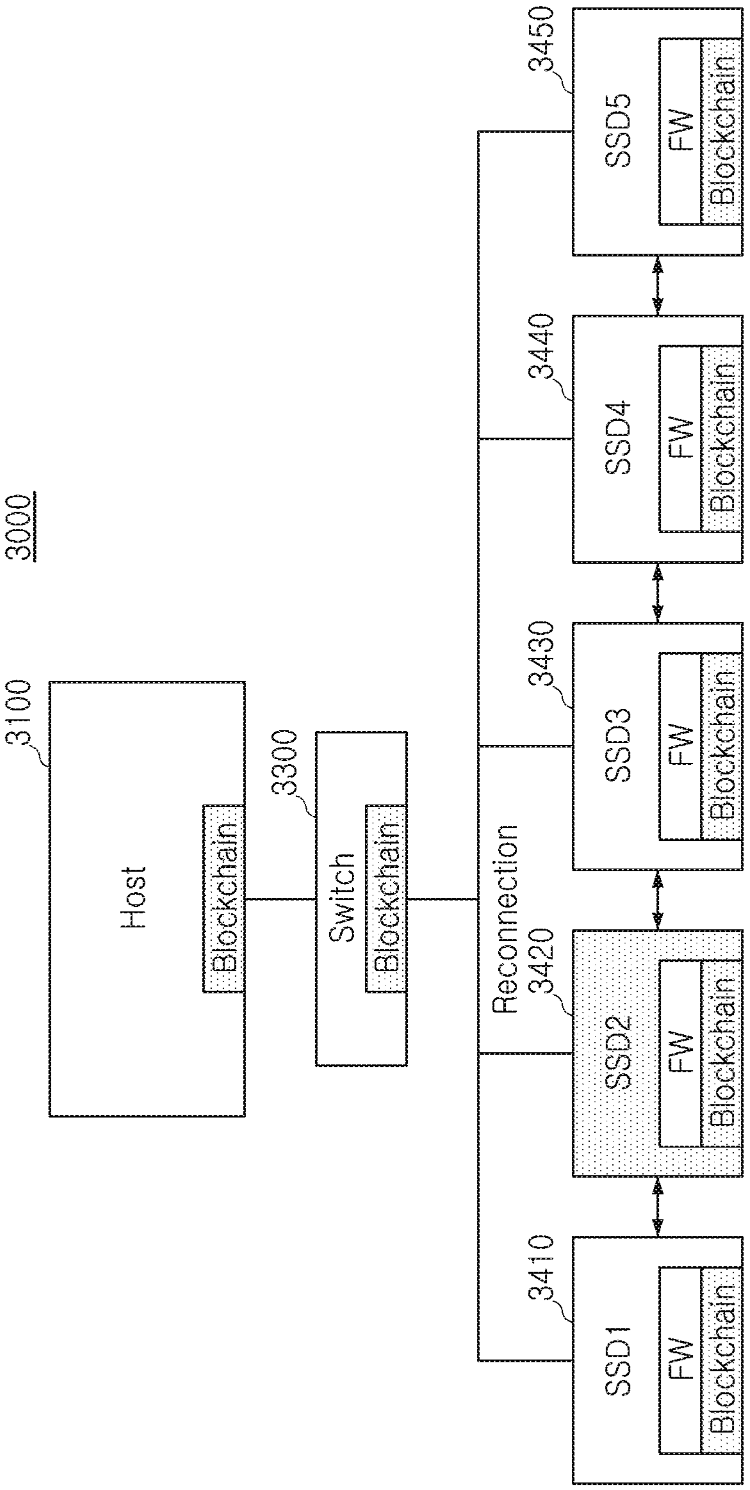
FIG. 12 is a diagram illustrating reconnection of one or more devices to a storage system according to one or more aspects of the present disclosure.

FIG. 12 is a diagram illustrating an example in which one of devices is reconnected to the storage system 3000 according to one or more aspects of the present disclosure. Referring to FIG. 12, the storage system 3000 may include a host device 3100, a switch device 3300, and first through fifth storage devices 3410-3450. It will be assumed that the second storage devices SSD2 and 3420 are detached from the storage system 3000 and reconnected, as illustrated in FIG. 11.

In an example embodiment, at least one of the first through fifth storage devices 3410-3450 may support offloading for performing a portion of functions of the host device 3100.

Figure 13:
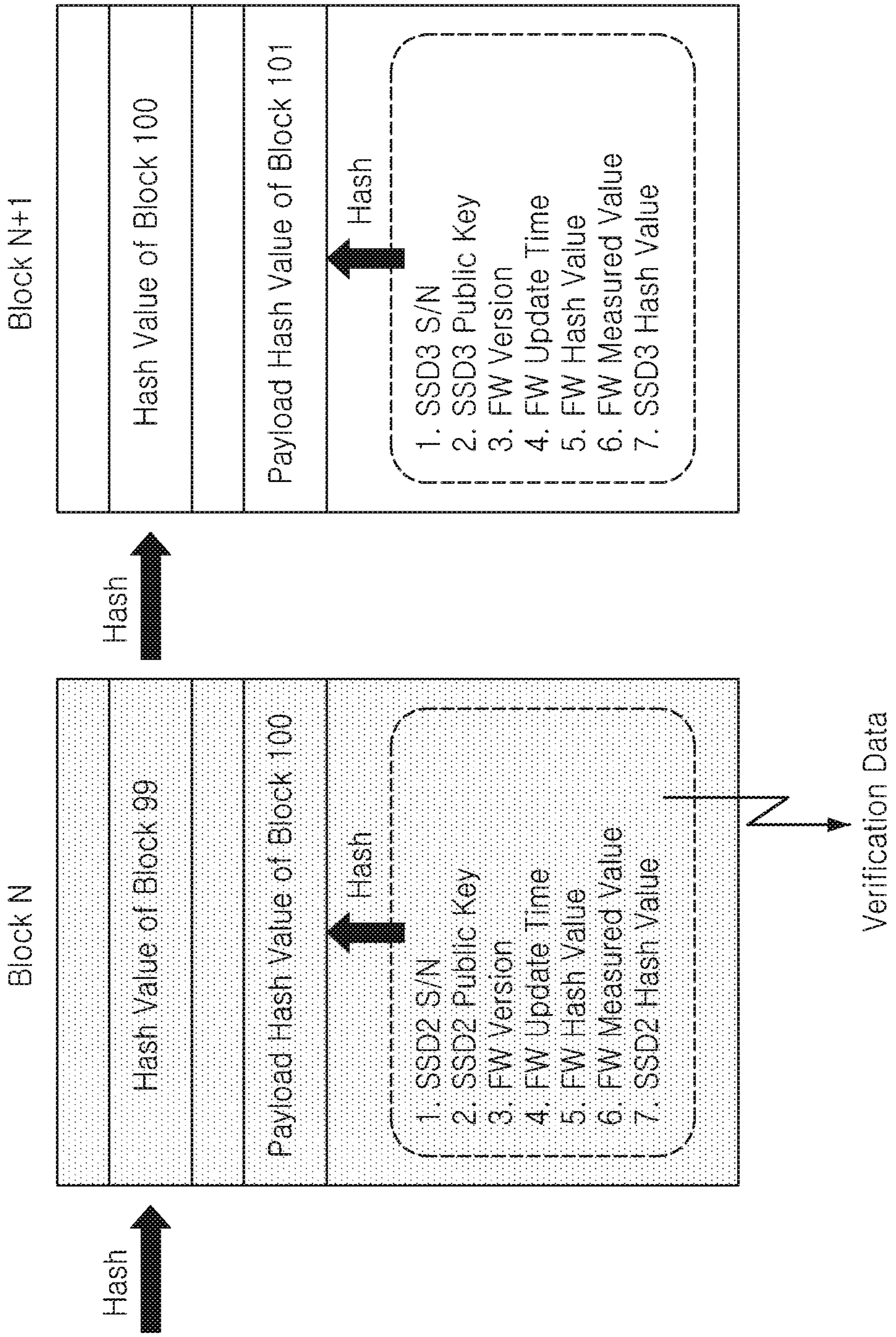
FIG. 13 is a diagram illustrating a payload of an Nth blockchain block used for device authentication according to one or more aspects of the present disclosure.

Other devices 3100, 3300, 3410, 3430, 3440, and 3450 in the blockchain may request authentication from the reconnected second storage devices SSD2 and 3420. For example, other devices 3100, 3300, 3410, 3430, 3440, and 3450 may perform device authentication using a hash value of the payload of the N-th blockchain block corresponding to the second storage device SSD2 as illustrated in FIG. 13. That is, by comparing the hash value of the payload of the second storage device SSD2 stored in the blockchain ledger before reconnection with the hash value of the payload of the second storage device SSD2 after reconnection, whether to authenticate as a legitimate device may be determined (e.g., by other devices 3100, 3300, 3410, 3430, 3440, and 3450).

Figure 14:
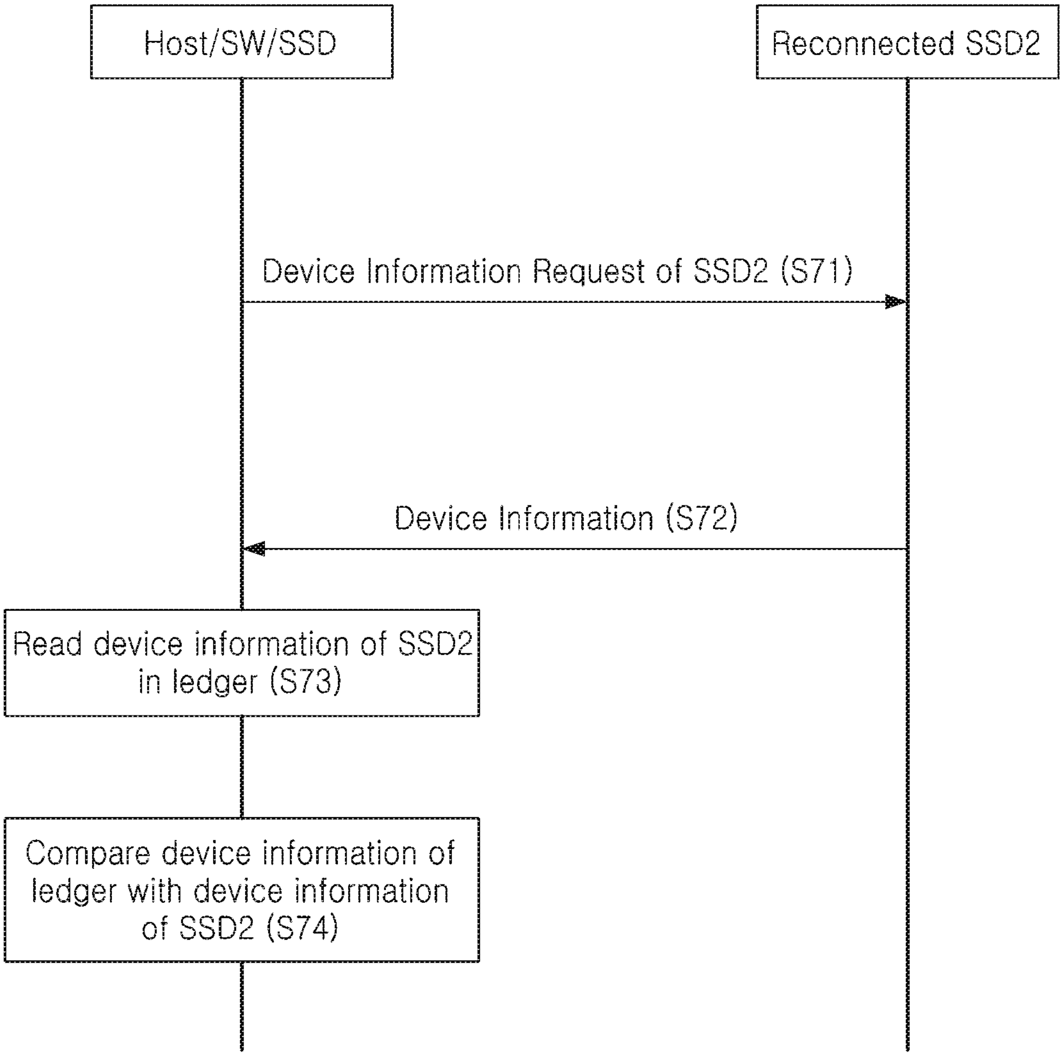
FIG. 14 is a diagram illustrating one or more authentication operations of a device according to reconnection illustrated in FIG. 12, according to one or more aspects of the present disclosure.

FIG. 14 is a ladder diagram illustrating an authentication operation of the device according to the reconnection illustrated in FIG. 12. Referring to FIGS. 12-14, the authentication operation performed on the reconnected storage device of the storage system 3000 may be performed as described herein.

At least one of the host device (Host), the switch device (SW), and the storage devices (SSD1, SSD3, SSD4, and SSD5) may detect the reconnection of the second storage device (SSD2) and may request device information from the second storage device SSD2 (S71). The second storage device SSD2 may transmit device information to at least one device in response to the device information request (S72). At least one device may read device information of the second storage device SSD2 from the blockchain ledger (S73). At least one device may compare the device information read from the blockchain ledger with the device information transmitted from the second storage device SSD2 (S74). As a result of the comparison, when the device information read from the blockchain ledger and the device information transmitted from the second storage device SSD2 match, the reconnected second storage device SSD2 may be authenticated as a legitimate device connected to the storage system 3000.

Figure 15:
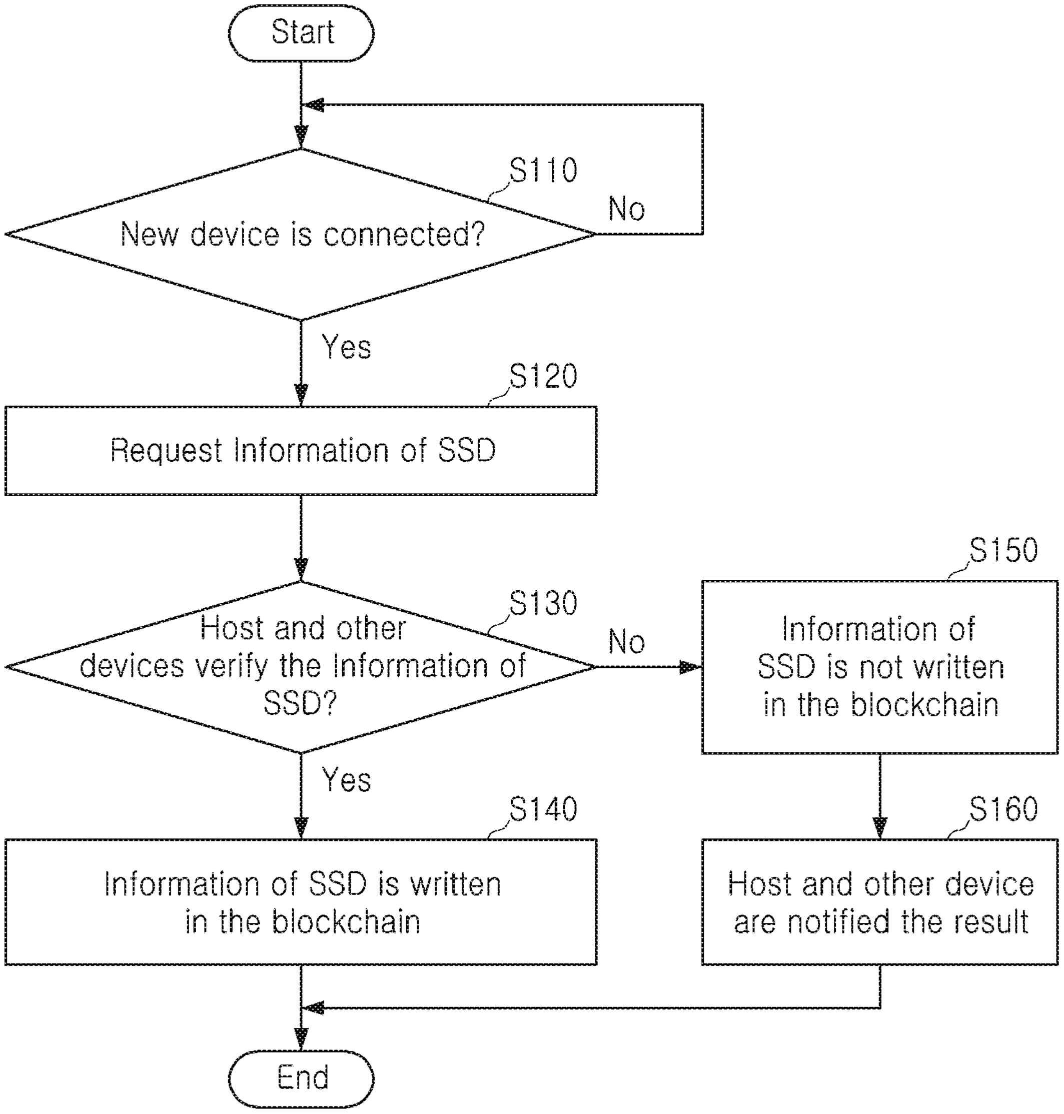
FIG. 15 is a flowchart illustrating a method of operating a storage system according to one or more aspects of the present disclosure.

FIG. 15 is a flowchart illustrating a method of operating a storage system according to an example embodiment. Referring to FIG. 15, the host device may determine whether a new storage device (e.g., SSD3 illustrated in FIG. 10) is connected (S110). When a new device is not connected, the related connection detection operation may continue. When the new storage device SSD3 is connected, the host device may request device information from the newly connected storage device SSD3 (S120). The newly connected storage device SSD3 may transmit device information thereof to one or more other devices (e.g., in some examples, to the entirety of the other devices). Thereafter, the host device and other devices may attest device information of the new storage device SSD3 (S130). When the device attestation operation of the new storage device SSD3 is completed, information of the new storage device SSD3 may be written to the blockchain ledger (S140). When the device attestation operation of the new storage device SSD3 is not completed, the device information of the new storage device is not written to the blockchain ledger (S150), and the host device and other devices may notify the results thereafter (S160).

Figure 16:
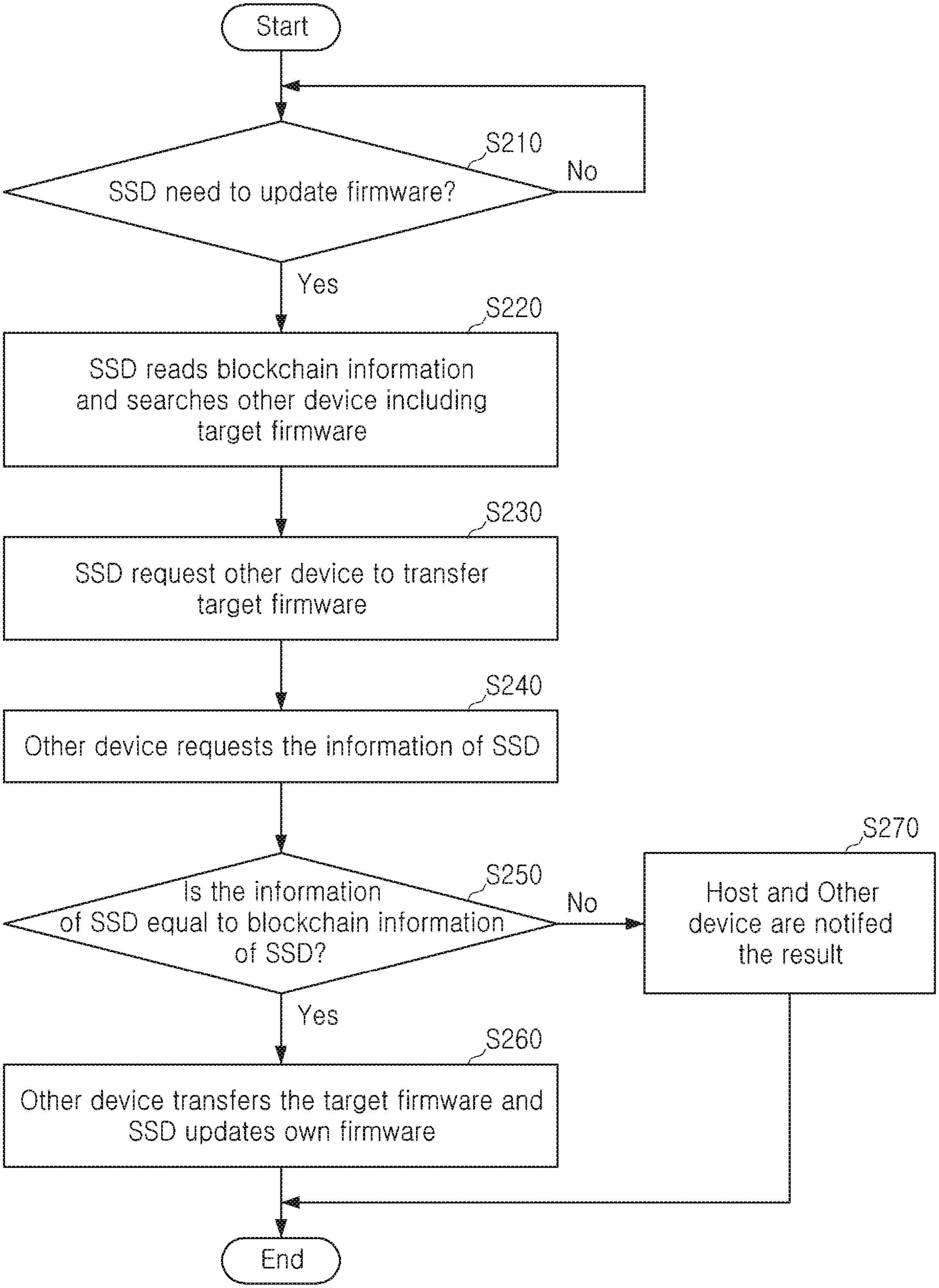
FIG. 16 is a flowchart illustrating a method of operating a storage system according to one or more aspects of the present disclosure.

FIG. 16 is a flowchart illustrating a method of operating a storage system according to another example embodiment. In some examples, referring to FIG. 16, the process of updating firmware of the storage device of the storage system may be performed as described herein.

The storage device SSD3 may determine whether or not to update firmware (e.g., using the blockchain ledger) (S210). When it is determined to update the firmware of the storage device SSD3, the storage device SSD3 may identify the latest firmware version of another device (e.g., SSD2) in the blockchain (S220). The storage device SSD3 may request the target firmware from another device SSD2 (S230). Another device SSD2 may transmit an authentication request message to the storage device SSD3 (S240). The storage device SSD3 may transmit device information corresponding to the authentication request to another device SSD2. Another device SSD2 may determine whether the device information transmitted from the storage device SSD3 matches the information of the storage device SSD3 written to the blockchain ledger (S250). When the information transmitted from the storage device SSD3 matches the information of the storage device SSD3 written to the blockchain ledger, another device SSD2 may transmit the target firmware to the storage device SSD3 (S260). When the information transmitted from the storage device SSD3 does not match the information of the storage device SSD3 written to the blockchain ledger, other devices may notify the result (S270).

Figure 17:
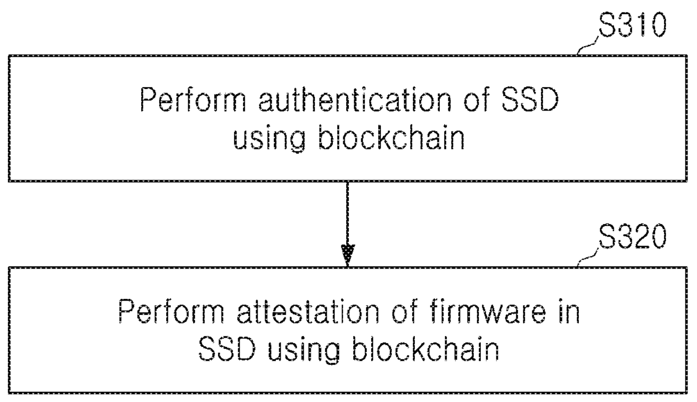
FIG. 17 is a flowchart illustrating a method of operating a storage system according to one or more aspects of the present disclosure.

FIG. 17 is a flowchart illustrating a method of operating a storage system according to another example embodiment. For example, referring to FIGS. 2-17, the firmware attestation operation performed on the storage system may be performed as described herein.

One of the internal devices of the storage system may perform authentication on the storage device using a blockchain (S310). In an example embodiment, an authentication operation may be performed by transmitting the authentication request message to the storage device through the switch device, receiving a certificate signed in the authentication request message from the storage device using the private key through the switch device, reading the public key of the storage device stored in the blockchain ledger, and decrypting the signed certificate using the public key. After the device authentication, one of the devices may perform attestation on a normal operation of the firmware using the blockchain (S320). In an example embodiment, an attestation operation on the firmware may be performed by requesting the firmware measurement value from the storage device through the switch device, receiving the firmware measurement value corresponding to the request from the storage device through the switch device, reading the firmware measurement value of the storage device stored in the blockchain ledger, and comparing the read firmware measurement value with the received firmware measurement value.

In an example embodiment, the host device may monitor whether the storage device is additionally connected or reconnected to the switch device. In an example embodiment, when the storage device is additionally connected or reconnected to the switch device of the storage device, a new blockchain block may be created, and the generated blockchain block may be combined with the blockchain.

The storage device in an example embodiment may be implemented to perform a portion of functions of the host device.

Figure 18:
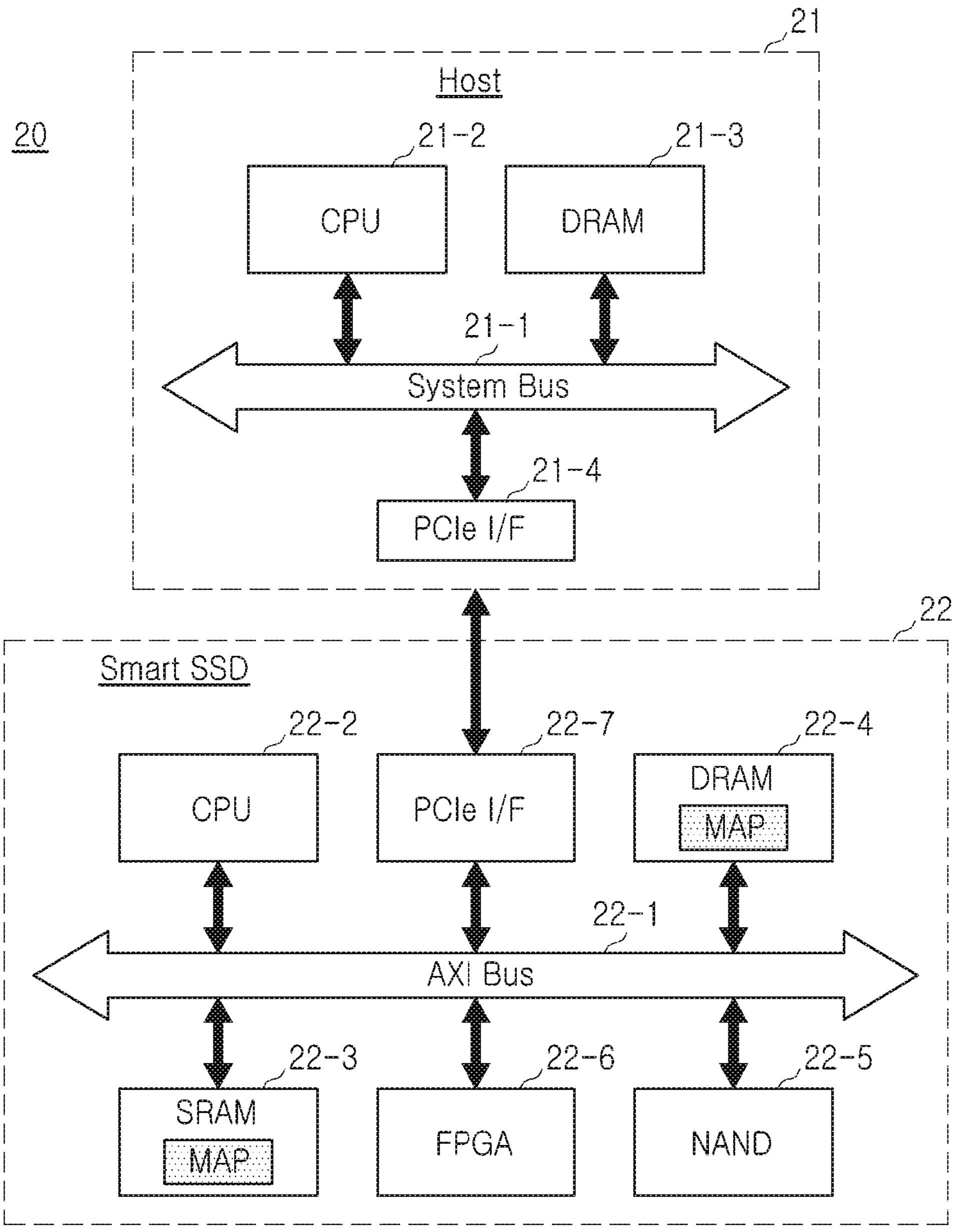
FIG. 18 is a diagram illustrating a computing system according to one or more aspects of the present disclosure.

FIG. 18 is a diagram illustrating a computing system 20 according to one or more aspects of the present disclosure. For example, referring to FIG. 18, the computing system 20 in the example embodiment may include a host device 21 and a smart storage device 22.

The host device 21 may include a central processing unit 21-2 (CPU) connected to a system bus 21-1, a volatile memory device 21-3 (DRAM), and an interface circuit 21-4.

The smart storage device 22 may include a central processing unit 22-2 connected to the bus 22-1, a buffer memory 22-3 (e.g., static random access memory (SRAM)), a volatile memory device 22-4 (e.g., dynamic RAM (DRAM)), a nonvolatile memory device 22-5 (NAND), an arithmetic processing unit 22-6 (FPGA), and an interface circuit 22-7.

Figure 19:
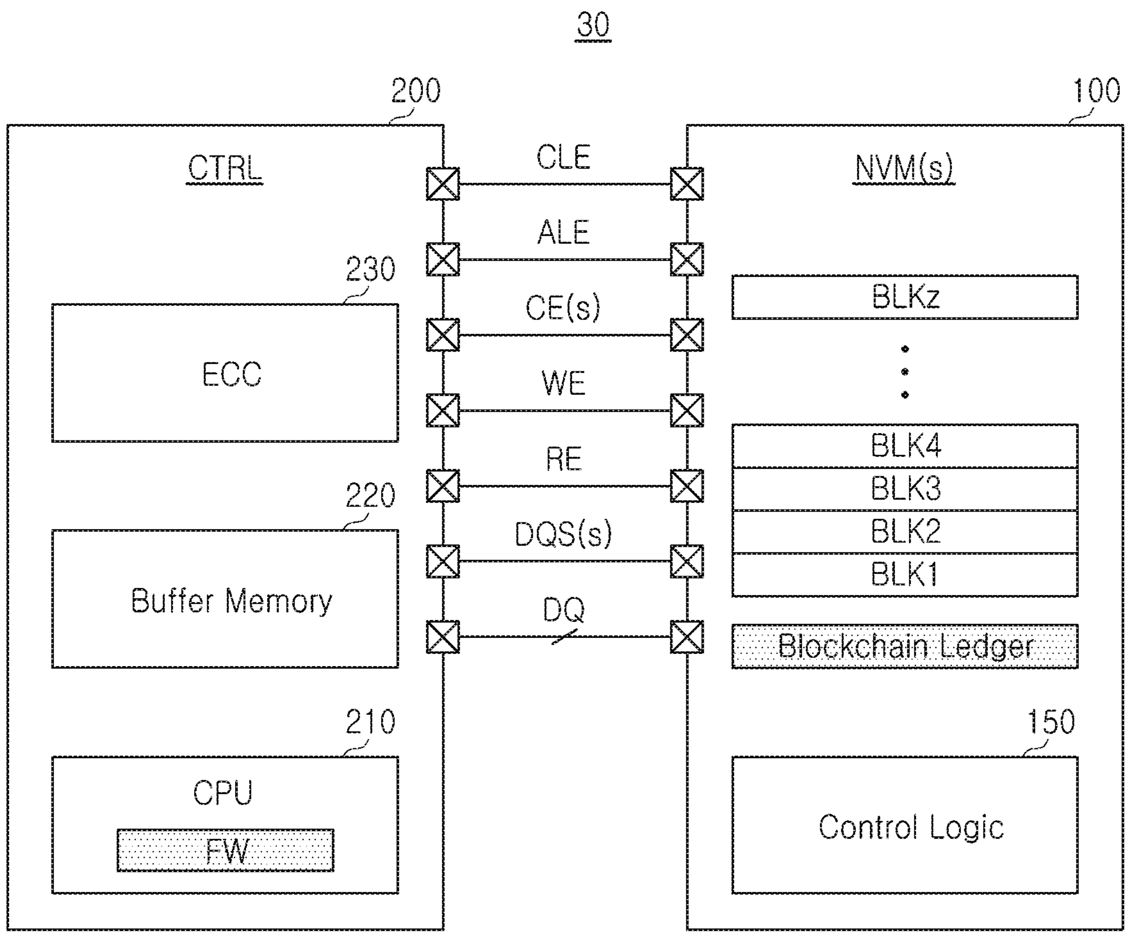
FIG. 19 is a diagram illustrating a storage device according to one or more aspects of the present disclosure.

FIG. 19 is a diagram illustrating a storage device 30 according to one or more aspects of the present disclosure. Referring to FIG. 19, the storage device 30 may include at least one nonvolatile memory device NVM(s) 100 and a controller CTRL 200.

At least one nonvolatile memory device 100 may be implemented to store data. The nonvolatile memory device 100 may be implemented as a NAND flash memory, a vertical NAND flash memory, a NOR flash memory, a resistive random access memory (RRAM), a phase-change memory (PRAM), a magnetoresistive random access memory (MRAM), a ferroelectric random access memory (FRAM), a spin transfer torque random access memory (STT-RAM), or the like. Also, in some examples, the nonvolatile memory device 100 may be implemented as a three-dimensional array structure. The example embodiment may be applicable a flash memory device in which the charge storage layer is formed of a conductive floating gate, and also to a charge trap flash (CTF) in which the charge storage layer is formed of an insulating layer. Hereinafter, the nonvolatile memory device 100 may be implemented as a vertical NAND flash memory device (VNAND).

Also, the nonvolatile memory device 100 may be implemented to include a plurality of memory blocks (e.g., BLK1 to BLKz, where z is an integer equal to or greater than 2) and the control logic 150. Each of the plurality of memory blocks BLK1 to BLKz may include a plurality of pages (e.g., Page 1 to Page m, where m is an integer equal to or greater than 2). Each of the plurality of pages Page 1 to Page m may include a plurality of memory cells. Each of the plurality of memory cells may store at least one bit.

In an example embodiment, at least one of the plurality of memory blocks BLK1 to BLKz may be implemented to store the blockchain ledger described with reference to FIGS. 1-18.

The control logic 150 may receive a command and an address from the controller 200 (CTRL), and may perform an operation (a program operation, a read operation, an erase operation, or the like) corresponding to the received command to memory cells corresponding to the address The controller 200 (CTRL) may be connected to at least one nonvolatile memory device 100 through a plurality of control pins for transmitting control signals (e.g., CLE, ALE, CE(s), WE, RE, or the like). Also, the controller 200 (CTRL) may be configured to control the nonvolatile memory device 100 using control signals (CLE, ALE, CE(s), WE, RE, or the like). For example, the nonvolatile memory device 100 may perform a program operation/read operation/erase operation by latching a command or an address on an edge of a write enable (WE)/read enable (RE) signal according to a command latch enable (CLE) signal and an address latch enable (ALE). For example, during a read operation, the chip enable signal CE may be activated, CLE may be activated during a command transmission period, ALE may be activated during an address transmission period, and RE may be toggled in the period in which data is transmitted through the data signal line DQ. The data strobe signal DQS may be toggled with a frequency corresponding to the data input/output speed. The read data may be transmitted in sequence in synchronization with the data strobe signal DQS.

In an example embodiment, the controller 200 may receive a device authentication request message of an external device (e.g., a host device, another storage device, a switch device), the controller 200 may read a blockchain ledger from the at least one nonvolatile memory device 100, and the controller 200 may transmit authentication information corresponding to the blockchain ledger to an external device in response to a device authentication request.

In an example embodiment, the authentication information may include a value of signing the authentication request message with the private key of the storage device 30, and the private key of the storage device may correspond to the public key of the storage device stored in the blockchain ledger. In another example embodiment, the authentication information may include device information of the storage device 30 stored in the blockchain ledger. In an example embodiment, the controller 200 may perform an authentication operation on another device using a blockchain ledger. In an example embodiment, the controller 200 may perform an attestation operation for the firmware of another device using the blockchain ledger.

Also, in some examples, the controller 200 may include at least one processor 210 (e.g., CPU(s)), and a buffer memory 220.

The processor 210 may be implemented to control overall operations of the storage device 30. The processor 210 may perform various management operations such as cache/buffer management, firmware management, garbage collection management, wear leveling management, data deduplication management, read refresh/reclaim management, bad block management, multi-stream management, host data and nonvolatile memory mapping management, quality of service (QoS) management, system resource allocation management, nonvolatile memory queue management, read level management, erase/program management, hot/cold data management, power loss protection management, dynamic thermal management, initialization management, redundant array of inexpensive disk (RAID) management, etc.

The processor 210 may be implemented to drive firmware. The processor 210 may read the blockchain ledger from the nonvolatile memory device 100 and may perform the device authentication operation, the firmware attestation operation, or the firmware update operation described herein (e.g., with reference to FIGS. 2-18) using the blockchain ledger.

The buffer memory 220 may be implemented as a volatile memory (e.g., SRAM, DRAM, synchronous DRAM (SDRAM), or the like) or a nonvolatile memory (flash memory, phase-change RAM (PRAM), magneto-resistive RAM (MRAM), resistive RAM (ReRAM), ferro-electric RAM (FRAM), or the like).

Figure 20:
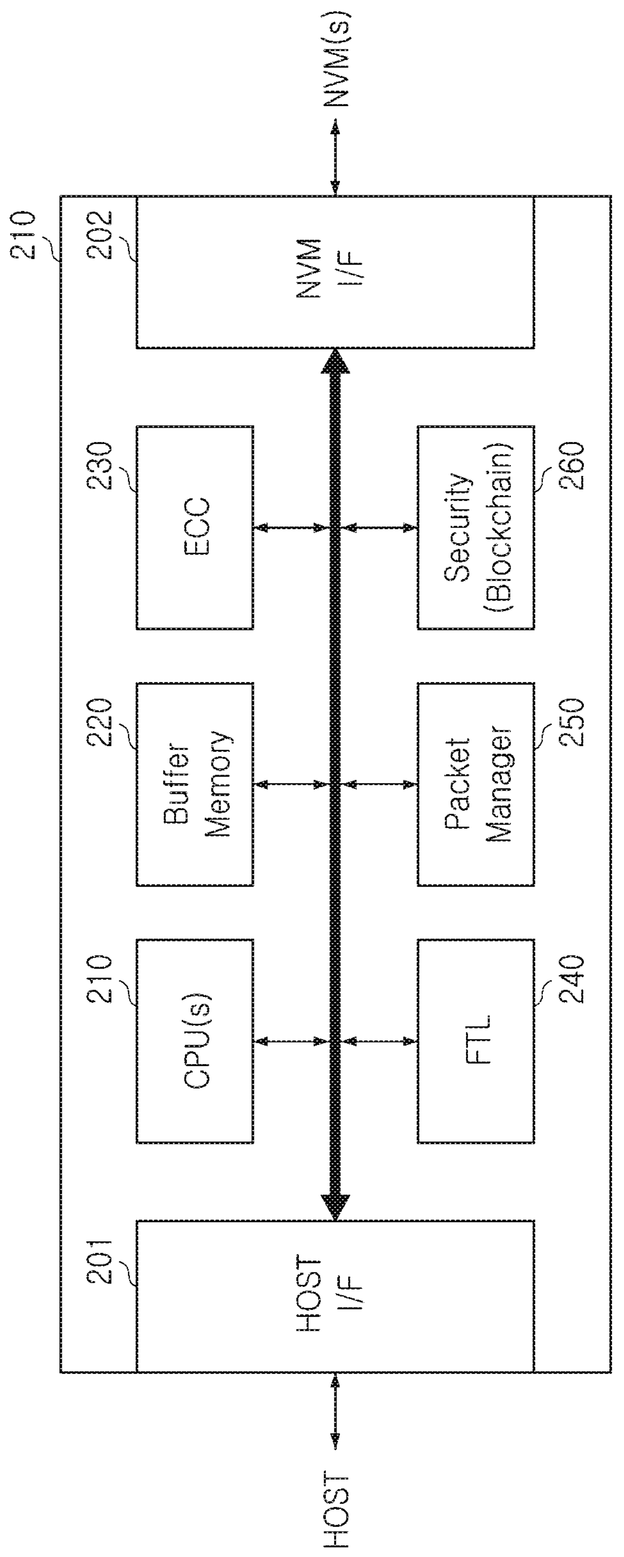
FIG. 20 is a diagram illustrating a controller according to one or more aspects of the present disclosure.

FIG. 20 is a diagram illustrating a controller 200 according to one or more aspects of the present disclosure. Referring to FIG. 20, the controller 200 may include a host interface 201, a memory interface 202, at least one CPU 210, a buffer memory 220, an error correction circuit 230, and a flash conversion layer manager 240, a packet manager 250, and a security module 260.

The host interface 201 may be implemented to transmit packets to and receive packets from the host (e.g., HOST). A packet transmitted from the host to the host interface 201 may include a command or data to be written to the nonvolatile memory device 100. A packet transmitted from the host interface 201 to the host may include a response to a command or data read from the nonvolatile memory device 100. The memory interface 202 may transmit data to be written to the nonvolatile memory device 100 to the nonvolatile memory device 100 or may receive data read from the nonvolatile memory device 100. In some embodiments, the memory interface 202 may be implemented to comply with a standard such as JEDEC toggle or open NAND flash interface (ONFI).

The buffer memory 220 may temporarily store data to be written to the nonvolatile memory device 100 or data read from the nonvolatile memory device 100. In an example embodiment, the buffer memory 220 may be a component provided in the controller 200. In another example embodiment, the buffer memory 220 may be disposed externally of the controller 200.

The error correction code (ECC) circuit 230 may be implemented to generate an error correction code during a program operation and to recover data using the error correction code during a read operation. That is, the ECC circuit 230 may generate an ECC for correcting a fail bit or an error bit of data received from the nonvolatile memory device 100. The ECC circuit 230 may form DATA to which a parity bit is added by performing error correction encoding of data provided to the nonvolatile memory device 100. The parity bit may be stored in the nonvolatile memory device 100.

Also, the ECC circuit 230 may perform error correction decoding on the DATA output by the nonvolatile memory device 100. The ECC circuit 230 may correct an error using parity. The ECC circuit 230 may correct an error using a coded modulation such as low density parity check (LDPC) code, Bose-Chaudhuri-Hocquenghem (BCH) code, turbo code, Reed-Solomon (RS) code, convolution code, recursive systematic code (RSC), trellis-coded modulation (TCM), block coded modulation (BCM), or the like. When error correction is impossible in the error correction circuit 230, a read retry operation may be performed.

The flash translation layer manager 240 may perform various functions such as address mapping, wear-leveling, and garbage collection. The address mapping operation may be an operation of changing a logical address received from the host into a physical address used to actually store data in the nonvolatile memory device 100. Wear-leveling may be a technique for preventing excessive degradation of a specific block by ensuring that blocks in the nonvolatile memory device 100 are used uniformly, and may be implemented through firmware technique of balancing erase counts of physical blocks. Garbage collection may be a technique for securing usable capacity in the nonvolatile memory device 100 by copying valid data of a block to a new block and erasing an existing block.

The packet manager 250 may generate a packet according to the protocol of the interface negotiated with the host, or may parse various information from the packet received from the host.

The security module 260 may perform at least one of an encryption operation and a decryption operation for data input to the CPU 210 using a symmetric-key algorithm. The security module 260 may include an encryption module and a decryption module. In an example embodiment, the security module 260 may be implemented in hardware/software/firmware. Also, the security module 260 may be implemented to perform an authentication operation with an external device or to perform a fully homogeneous encryption function.

The security module 260 may be implemented to perform a security function of the storage device 30. For example, the security module 260 may perform a self-encryption disk (SED) function or a trusted computing group (TCG) security function. The SED function may store encrypted data in the nonvolatile memory device 100 using an encryption algorithm or may decrypt data encrypted from the nonvolatile memory device 100. The encryption/decryption operation may be performed using an internally generated encryption key. In an example embodiment, the encryption algorithm may be implemented as an advanced encryption standard (AES) encryption algorithm. However, employed encryption algorithms are not limited thereto, and other encryption algorithms may be used by analogy, without departing from the scope of the present disclosure. The TCG security function may provide a mechanism enabling access control to user data on the storage device 30. For example, the TCG security function may perform an authentication procedure between the external device and the storage device 30. In an example embodiment, the SED function or the TCG security function may be optionally selected.

The storage device in the example embodiment may be applicable to a data server system.

Figure 21:
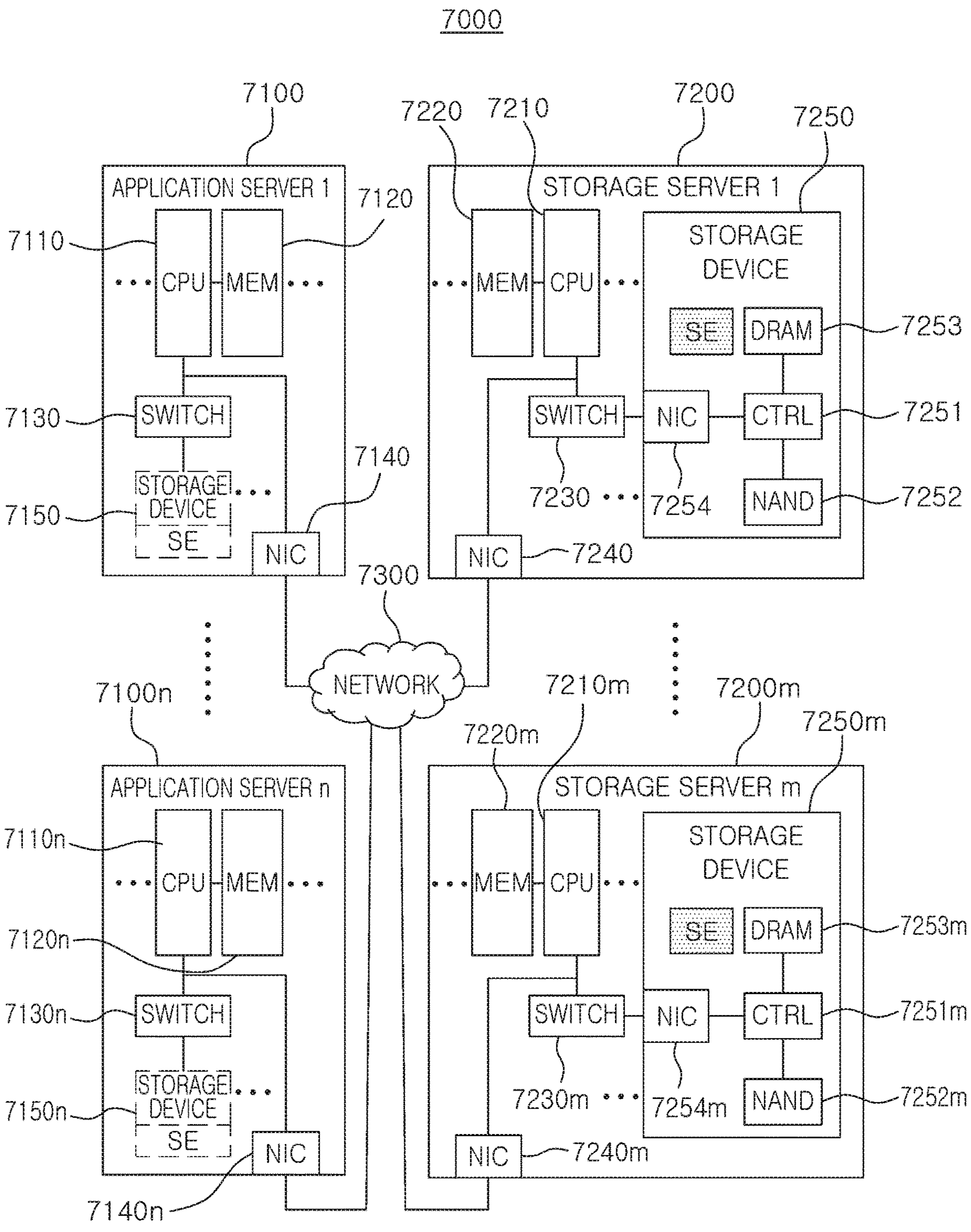
FIG. 21 is a diagram illustrating a data center according to one or more aspects of the present disclosure.

FIG. 21 is a diagram illustrating a data center to which a memory device according to an example embodiment is applied. Referring to FIG. 21, a data center 7000 may include application servers **7100-7100*n* and storage servers 7200-7200*m*. The number of application servers 7100-7100*n* and the number of storage servers 7200-7200*m* may be variously selected according to an example embodiment, and the number of application servers 7100-7100*n* and the number of storage servers 7200-7200*m*** may be different.

The application server 7100 or the storage server 7200 may include at least one of processors 7110 and 7210 and memories 7120 and 7220. For example, as for the storage server 7200, the processor 7210 may control overall operations of the storage server 7200, may access the memory 7220 and may execute instructions or data loaded into the memory 7220. The memory 7220 may be implemented as double data rate synchronous DRAM (DDR SDRAM), high bandwidth memory (HBM), hybrid memory cube (HMC), dual in-line memory module (DIMM), Optane DIMM, or nonvolatile DIMM (NVMDIMM). In example embodiments, the number of processors 7210 and the number of memories 7220 included in the storage server 7200 may be variously selected. In an example embodiment, the processor 7210 and the memory 7220 may provide a processor-memory pair. In an example embodiment, the number of processors 7210 and the number of memories 7220 may be different. The processor 7210 may include a single-core processor or a multi-core processor. The description of the storage server 7200 may be similarly applied to the application server 7100. In example embodiments, the application server 7100 may not include the storage device 7150. The storage server 7200 may include at least one storage device 7250. The number of storage devices 7250 included in the storage server 7200 may be variously selected in example embodiments.

The application servers **7100-7100*n* and the storage servers 7200-7200*m* may communicate with each other via the network 7300. The network 7300 may be implemented using fiber channel (FC) or Ethernet. In this case, FC may be a medium used for relatively high-speed data transmission, and an optical switch device providing high performance/high availability may be used. Depending on an access method of the network 7300, the storage servers 7200-7200*m*** may be provided as a file storage medium, a block storage medium, or an object storage medium.

In an example embodiment, the network 7300 may be implemented as a storage-only network, such as a storage area network (SAN). For example, the SAN may be implemented as an FC-SAN which may use an FC network and may be implemented according to FC protocol (FCP). As another example, the SAN may be implemented an IP-SAN using a TCP/IP network and may be implemented according to an iSCSI (SCSI over TCP/IP or Internet SCSI) protocol. In other example embodiments, the network 7300 may be implemented a generic network, such as a TCP/IP network. For example, the network 7300 may be implemented according to protocols such as FC over Ethernet (FCoE), network attached storage (NAS), and NVMe over Fabrics (NVMe-oF). The description of the application server 7100 may be applied to the other application servers **7100*n*, and the description of the storage server 7200 may also be applied to other storage server 7200***m*.

The application server 7100 may store data requested to be stored by a user or a client in one of the storage servers 7200-7200*m* through the network 7300. Also, the application server 7100 may obtain data read requested by a user or a client from one of the storage servers 7200-7200*m* through the network 7300. For example, the application server 7100 may be implemented as a web server or Database Management System (DBMS).

The application server 7100 may access the memory 7120*n* or the storage device 7150*n* included in the other application server 7100*n* through the network 7300, or may access the memory 7220-7220*m* or the storage device 7250-7250*m* included in the storage server 7200-7200*m* through the network 7300. Accordingly, the application server 7100 may perform various operations on data stored in the application servers 7100-7100*n* or the storage servers 7200-7200*m*. For example, the application server 7100 may execute a command for moving or copying data between the application servers 7100-7100*n* or the storage servers 7200-7200*m*. In this case, data may be transferred from the storage devices 7250-7250*m* of the storage servers 7200-7200*m* to the memories 7120-7120*n* of the application servers 7100-7100*n* through the memories 7220-7220*m* of the storage servers 7200-7200*m*, or may be directly transferred to the memories 7220-7220*m* of the storage servers 7200-7200*m*. Data transferring through the network 7300 may be encrypted data for security or privacy.

For example, as for the storage server 7200, the interface 7254 may provide a physical connection between the processor 7210 and the controller 7251 and a physical connection between the NIC 7240 and the controller 7251. For example, the interface 7254 may be implemented in a Direct Attached Storage (DAS) method for directly connecting to the storage device 7250 with a dedicated cable. Also, for example, the interface 1254 may be implemented by various interface methods, such as, for example, advanced technology attachment (ATA), serial ATA (SATA), external SATA (e-SATA), small computer small interface (SCSI), serial attached SCSI (SAS), peripheral component interconnection (PCI), PCI express (PCIe), NVMe (NVM express), IEEE 1394, universal serial bus (USB), secure digital (SD) card, multi-media card (MMC), embedded multi-media card (eMMC), Universal Flash Storage (UFS), embedded Universal Flash Storage (efuse), compact flash (CF) card interface, and the like.

The storage server 7200 may further include a switch device 7230 and a NIC 7240. The switch device 7230 may selectively connect the processor 7210 to the storage device 7250 or may selectively connect the NIC 7240 to the storage device 7250 under control of the processor 7210.

In an example embodiment, the NIC 7240 may include a network interface card, a network adapter, and the like. The NIC 7240 may be connected to the network 7300 by a wired interface, a wireless interface, a Bluetooth interface, an optical interface, or the like. The NIC 7240 may include an internal memory, a DSP, a host bus interface, and the like, and may be connected to the processor 7210 or the switch device 7230 through the host bus interface. The host bus interface may be implemented as one of the examples of interface 7254 described herein. In an example embodiment, the NIC 7240 may be integrated with at least one of the processor 7210, the switch device 7230, and the storage device 7250.

In the storage server 7200-7200*m* or the application server 7100-7100*n*, the processor may program or read data by transmitting a command to the storage devices 7130-7130*n* and 7250-7250*m* or the memories 7120-7120*n* and 7220-7220*m*. In this case, the data may be error-corrected data through an error correction code (ECC) engine. Data may be data processed by data bus inversion (DBI) or data masking (DM), and may include cyclic redundancy code (CRC) information. The data may be encrypted data for security or privacy.

The storage devices 7150-7150*m* and 7250-7250*m* may transmit a control signal and a command/address signal to the NAND flash memory devices 7252-7252*m* in response to a read command received from the processor. Accordingly, when data is read from the NAND flash memory devices 7252-7252*m*, a read enable (RE) signal may be input as a data output control signal and may output data to the DQ bus. A data strobe (DQS) may be generated using the RE signal. The command and address signals may be latched in the page buffer according to a rising edge or a falling edge of a write enable (WE) signal.

In an example embodiment, the storage devices 7150-7150*m* and 7250-7250*m* may perform device authentication/firmware qualification/firmware update using a blockchain as described in FIGS. 2-18.

The controller 7251 may control overall operations of the storage device 7250. In an example embodiment, the controller 7251 may include static random access memory (SRAM). The controller 7251 may write data in the NAND flash 7252 in response to the write command, or may read data from the NAND flash 7252 in response to the read command. For example, the write command or the read command may be provided from the processor 7210 in the storage server 7200, the processor 7210*m* in the other storage server 7200*m*, or the processors 7110 and 7110*n* in the application servers 7100 and 7100*n*. The DRAM 7253 may temporarily store (buffer) data to be written to the NAND flash 7252 or data read from the NAND flash 7252. Also, the DRAM 7253 may store metadata. The metadata may be user data or data generated by the controller 7251 to manage the NAND flash 7252.

A storage device in an example embodiment may include a nonvolatile memory device for storing the blockchain ledger storing information of the storage device, and a controller for reading and writing the blockchain ledger from the nonvolatile memory device. In an example embodiment, the controller may request device information from an external device, may read the value and information of the external device written to the blockchain ledger and may process the value and information. In an example embodiment, the public key may be included in the information stored in the blockchain ledger. The controller may authenticate that the external device is a legitimate device by receiving the private key signature received from the external device and decrypting the signed certificate using the public key of the external device stored in the blockchain ledger.

In an example embodiment, information stored in the blockchain ledger may include measurement values of firmware operations executed in a plurality of devices. In an example embodiment, the controller may request a measurement value when operating the firmware from an external device, and may, by comparing the measurement value transmitted from the external device with the firmware measurement value during normal operation of the external device written to the blockchain ledge, determine whether the values match.

A storage system in an example embodiment may include an SSD1 having (e.g., storing, reading, updating, etc.) a blockchain ledger, and an SSD2 having (e.g., storing, reading, updating, etc.) a blockchain ledger. Information of SSD1 and SSD2 may be stored in the blockchain ledger. In an example embodiment, the SSD1 may request information from the SSD2 and the SSD2 may transmit the corresponding value to the SSD1. In an example embodiment, SSD1 may read information of SSD2 from the blockchain ledger, and may process the read information and information received from SSD2. In an example embodiment, the public key may be included in the information stored in the blockchain ledger. In an example embodiment, the SSD1 may receive the private key signature received from SSD2, may decrypt the signature using the public key of SSD2 stored in the blockchain, and may authenticate that the device is SSD2. In an example embodiment, information stored in the blockchain ledger may include a measurement value during firmware operation executed on a plurality of devices. In an example embodiment, SSD1 may request the measurement value during firmware operation from SSD2 and may read the received measurement value and the firmware measurement value during normal operation of SSD2 written to the blockchain, thereby determining whether the values match.

The device described herein may be implemented as a hardware component, a software component, and/or a combination of a hardware component and a software component. For example, the devices and components described in the example embodiments may be implemented as one or more general purpose or special purpose computers such as a processor, a controller, an arithmetic logic unit (ALU), a digital signal processor, a microcomputer, a FPGA, and a programmable logic unit (PLU), a microprocessor, or other device executing and responding to instructions. The processing device may execute an operating system (OS) and one or more software applications running on the operating system. A processing device may also access, store, manipulate, process, and generate data in response to execution of the software. A single processing device may be used, but the processing device may include a plurality of processing elements or a plurality of types of processing elements. For example, the processing device may include a plurality of processors or a single processor and a single controller. Also, other processing configurations such as parallel processors may be implemented.

Software may include a computer program, code, instructions, or a combination of one or more thereof, and may configure the processing devices as intended or may command the processing devices independently or collectively. Software and/or data may be embodied in one kind of machine, component, physical device, virtual equipment, computer storage medium or device to be interpreted by the processing device or to provide instructions or data to the processing device. The software may be distributed over networked computer systems and may be stored or executed in a distributed manner. Software and data may be stored in one or more computer-readable recording media.

According to the aforementioned example embodiments, storage devices, storage systems having the same, and methods of operating the same may use resources efficiently while improving security by, for example, performing device authentication operation, performing firmware attestation operation, and/or performing firmware update operation between devices using a blockchain, according to one or more aspects of the present disclosure.

While the example embodiments have been illustrated and described above, it will be configured as apparent to those skilled in the art that modifications and variations could be created without departing from the scope of the present disclosure as defined by the appended claims.

What is claimed is:

1. An operating method of a blockchain-based peer-to-peer storage system, the method comprising:

searching, by a storage device, a target device having a target firmware in a blockchain ledger of the blockchain-based peer-to-peer storage system;

reading, by the storage device, a public key and firmware information of the target device from the blockchain ledger, wherein the storage device and the target device are nodes of the blockchain-based peer-to-peer storage system;

requesting, by the storage device, the target firmware from the target device based on the firmware information;

transmitting, by the storage device, an authentication request message to the target device;

receiving, by the storage device, a certificate signed with a private key of the target device from the target device;

performing, by the storage device, authentication of the target device by decrypting the signed certificate with the public key;

after authenticating the target device, performing, by the storage device, an attestation operation on the target firmware of the target device including:

requesting, from the target device, a measurement value that is generated during execution of an operation of the target firmware on the target device, receiving the measurement value from the target device, reading a stored measurement value associated with the target device from the blockchain ledger, comparing the stored measurement value with the received measurement value, and determining that the target firmware of the target device is operating normally when the stored measurement value matches the received measurement value or when a difference between the stored measurement value and the received measurement value is within a predetermined range;

after the attestation operation, receiving, by the storage device, the target firmware from the target device via a peer-to-peer interface;

updating the storage device with the target firmware; and updating, by the storage device, the blockchain ledger of the blockchain-based peer-to-peer storage system with updated firmware information indicating the target firmware is updated on the storage device.

2. The method of claim 1, further comprising:

sharing the blockchain ledger between the storage device and the target device.

3. The method of claim 2, further comprising:

storing the shared blockchain ledger in a nonvolatile memory device in the target device.

4. A storage device, comprising:

at least one nonvolatile memory device configured to:

include a plurality of memory blocks having a plurality of memory cells connected to wordlines and bitlines; and store a blockchain ledger in at least one of the plurality of memory blocks; and a controller configured to:

control the at least one nonvolatile memory device;

receive an authentication request message from an external device;

read the blockchain ledger from the at least one nonvolatile memory device;

transmit authentication information corresponding to the blockchain ledger to the external device in response to the authentication request; and perform an authentication operation with another device using the blockchain ledger, wherein the authentication information comprises a value based at least in part on signing the authentication request message with a private key of the controller, wherein the private key of the controller corresponds to a public key of the controller stored in the blockchain ledger, wherein the controller and the external device communicate with each other at least partly via a peer-to-peer interface, and wherein the controller is configured to perform the following operations to perform an attestation operation on a target firmware of the another device using the blockchain ledger:

requesting, from the another device, a measurement value that is generated during execution of an operation of the target firmware on the another device, receiving the measurement value from the another device, reading a stored measurement value associated with the another device from the blockchain ledger, comparing the stored measurement value with the received measurement value, and determining that the target firmware of the another device is operating normally when the stored measurement value matches the received measurement value or when a difference between the stored measurement value and the received measurement value is within a predetermined range.

5. The storage device of claim 4, wherein the authentication information comprises device information, of the controller or the at least one nonvolatile memory device, stored in the blockchain ledger.

6. A blockchain-based peer-to-peer storage system, comprising:

a plurality of storage devices each configured to store a blockchain ledger of the blockchain-based peer-to-peer storage system;

wherein a first storage device, among the plurality of storage devices, is configured to search a target device, among the plurality of storage devices, having a target firmware in the blockchain ledger and is configured to perform the following steps to authenticate the target device:

transmitting an authentication request message to the target device;

receiving a certificate corresponding to the authentication request message from the target device;

reading a public key of the target device in the blockchain ledger; and decrypting the certificate using the public key, and wherein the first storage device is configured to perform the following operations to perform an attestation operation on the target firmware operating on the target device using the blockchain ledger:

requesting, from the target device, a measurement value that is generated during execution of an operation of the target firmware on the target device, receiving the measurement value from the target device, reading a stored measurement value associated with the target device from the blockchain ledger, comparing the stored measurement value with the received measurement value, and determining that the target firmware of the target device is operating normally when the stored measurement value matches the received measurement value or when a difference between the stored measurement value and the received measurement value is within a predetermined range, wherein the first storage device is configured to:

transmit a firmware request message to the target device;

receive the target firmware corresponding to the firmware request message from the target device; and update the target firmware.

7. The blockchain-based peer-to-peer storage system of claim 6, wherein the target device is configured to:

receive the authentication request message from the first storage device; and generate the certificate by signing the authentication request message using a private key of the target device.

8. The blockchain-based peer-to-peer storage system of claim 6, wherein the first storage device is configured to:

monitor whether the target device is reconnected; and perform an authentication operation with the target device using the blockchain ledger when the target device is reconnected.

* * * * *